(12) United States Patent
Sasaki

(10) Patent No.: US 6,414,824 B1
(45) Date of Patent: Jul. 2, 2002

(54) THIN FILM MAGNETIC HEAD HAVING A SHIELD LAYER ADJACENT A GAP LAYER AND METHOD OF MANUFACTURING THE SAME

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 134 days.

(21) Appl. No.: 09/660,580

(22) Filed: Sep. 12, 2000

(30) Foreign Application Priority Data

Sep. 16, 1999 (JP) .......................................... 11-261872

(51) Int. Cl.$^7$ ............................... G11B 5/10; G11B 5/39
(52) U.S. Cl. ........................ 360/317; 360/319; 360/126
(58) Field of Search ................................. 360/317, 318, 360/319, 125, 126, 122

(56) References Cited

U.S. PATENT DOCUMENTS

| 5,438,747 A | 8/1995 | Krounbi et al. ............. 360/126 |
| 5,600,519 A | 2/1997 | Heim et al. ............... 29/603.16 |
| 6,266,868 B1 * | 7/2001 | Sasaki ........................ 29/603.1 |
| 6,304,414 B1 * | 10/2001 | Crue, Jr. et al. ............ 360/126 |

FOREIGN PATENT DOCUMENTS

| JP | 7-262519 | 10/1995 |
| JP | 8-249614 | 9/1996 |

\* cited by examiner

*Primary Examiner*—Jefferson Evans
(74) *Attorney, Agent, or Firm*—Oliff & Berridge, PLC

(57) ABSTRACT

Disclosed is a method of manufacturing a thin film magnetic head which realizes an accurate control of a pole width and a sufficient overwrite characteristic even when the pole width is narrowed. A top pole is magnetically coupled to a top pole tip by partially overlapping with a connection portion of the top pole tip. In a part of a bottom pole in a region corresponding to a magnetic coupling face in which the top pole and the top pole tip are magnetically coupled to each other, that is, an overlap region in which the top pole and the top pole tip overlap with each other, a magnetic shield layer having a shape in plane corresponding to the shape in plane of the overlap region is formed so as to be adjacent to a write gap layer. By the magnetic shield layer, propagation of a magnetic flux between the connection portion in the top pole tip and the bottom pole in the overlap region can be suppressed.

24 Claims, 29 Drawing Sheets

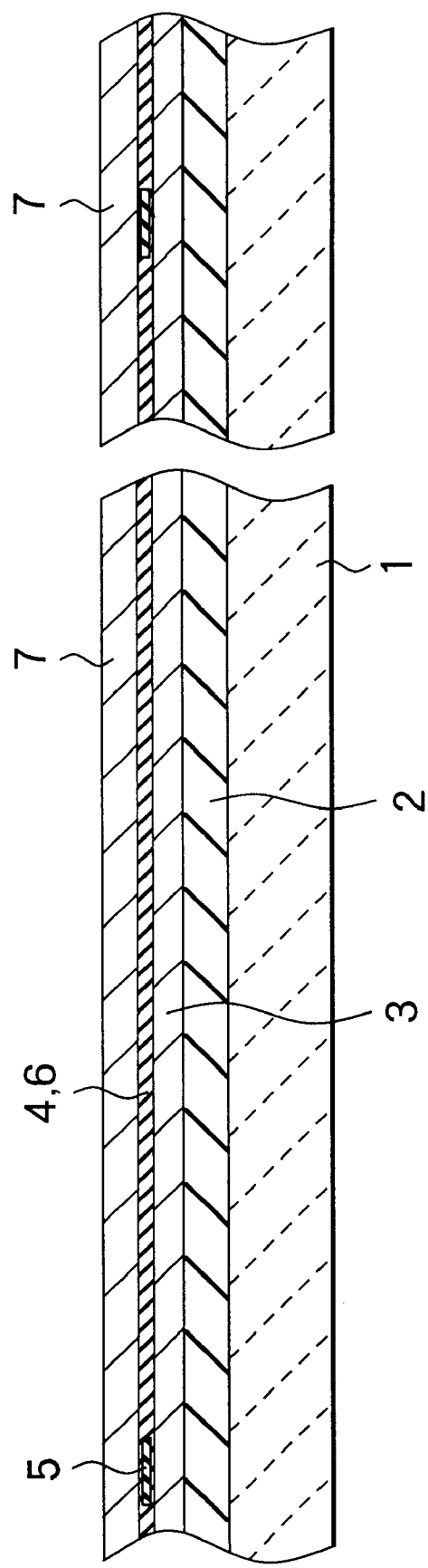

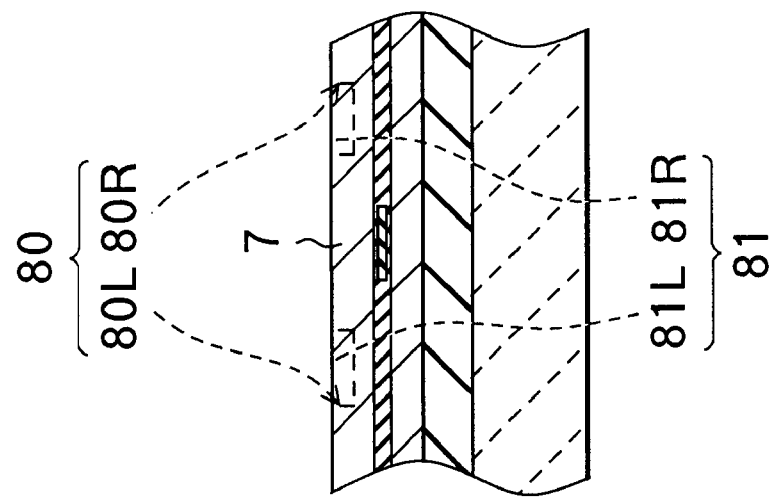

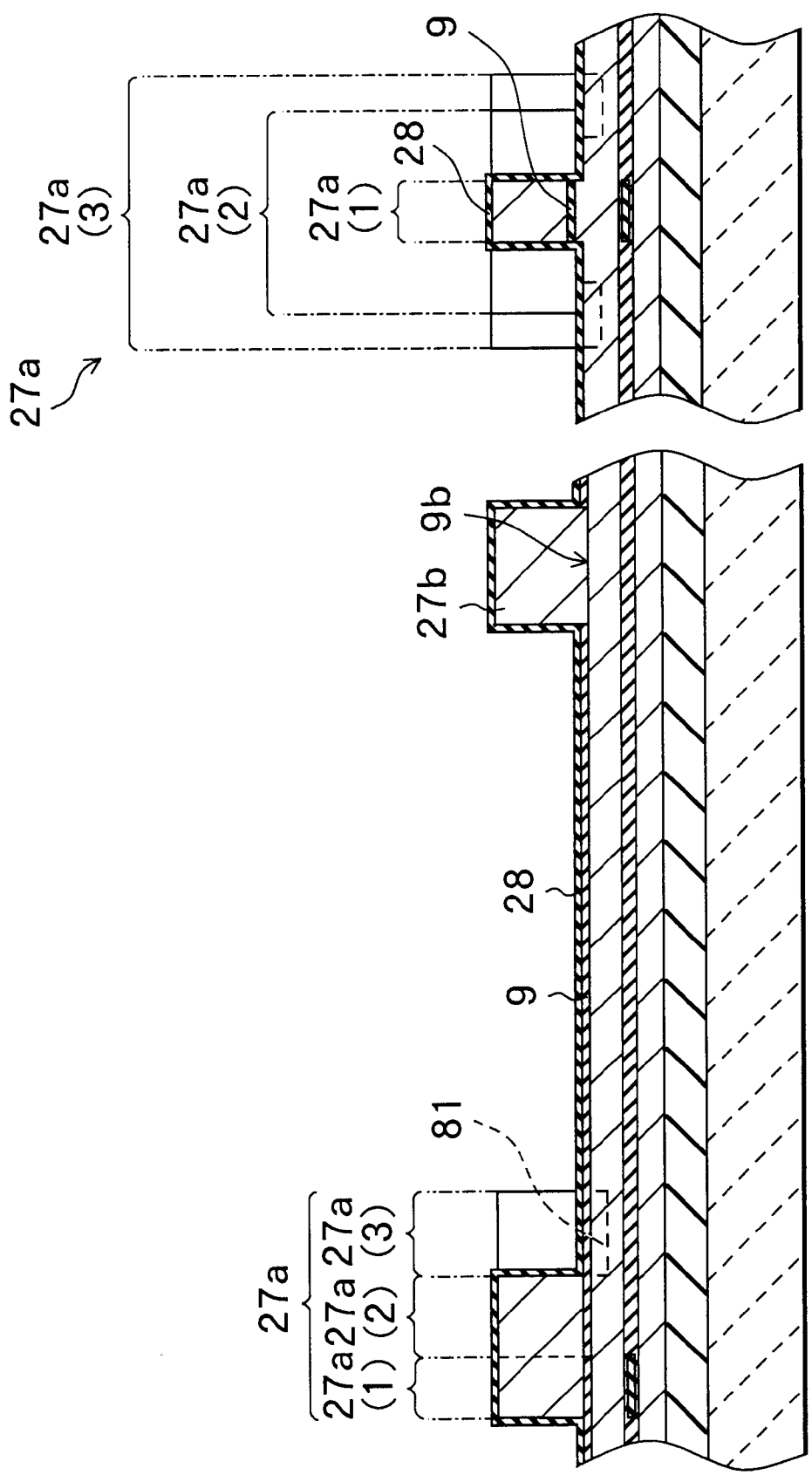

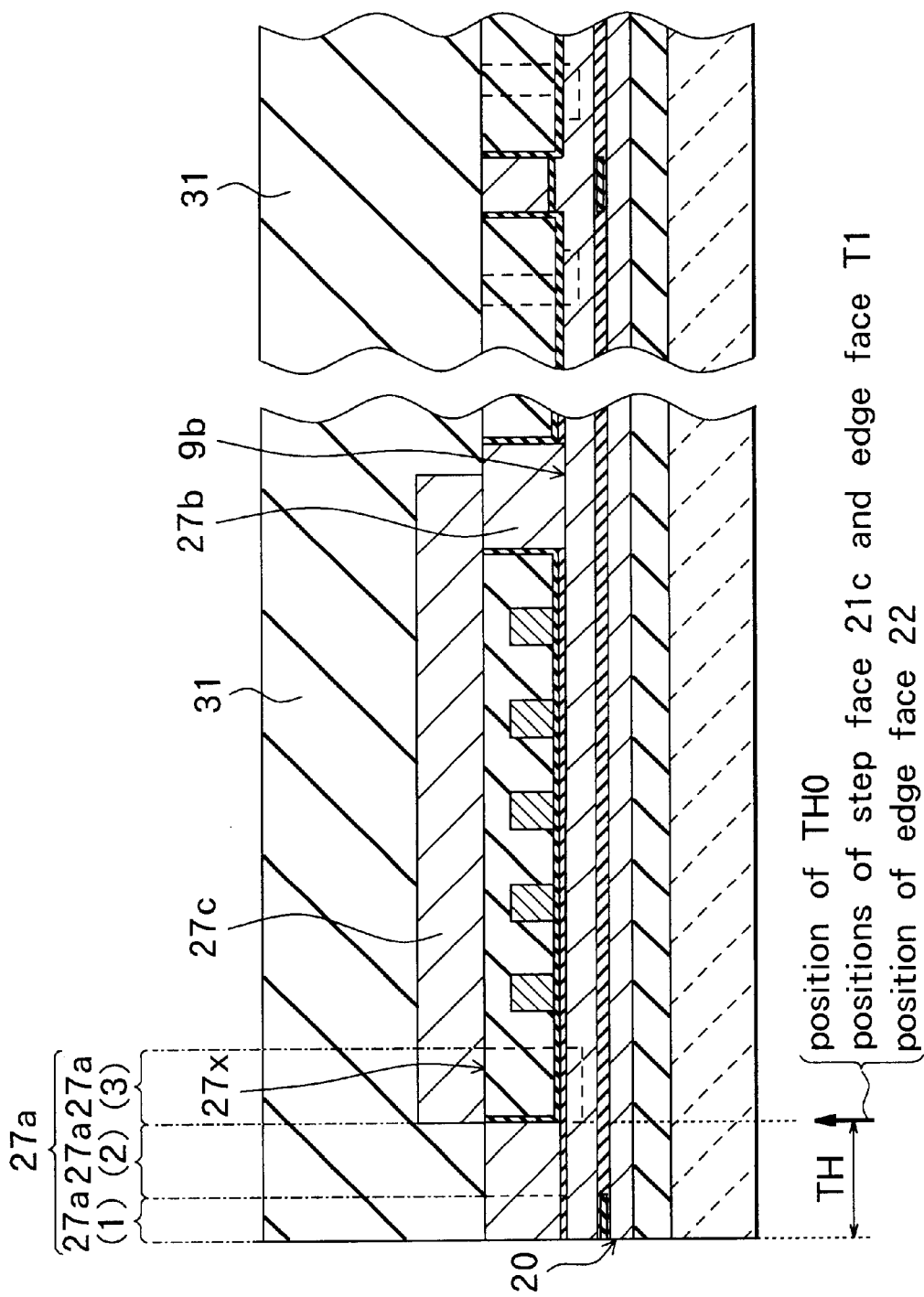

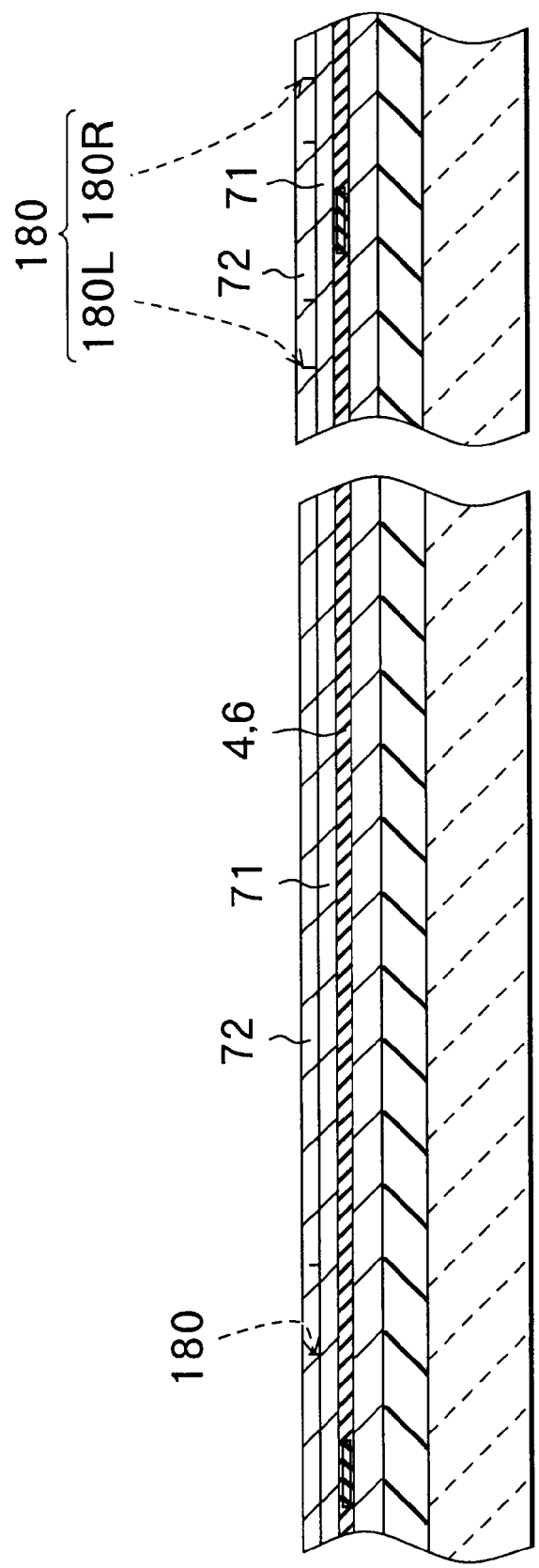

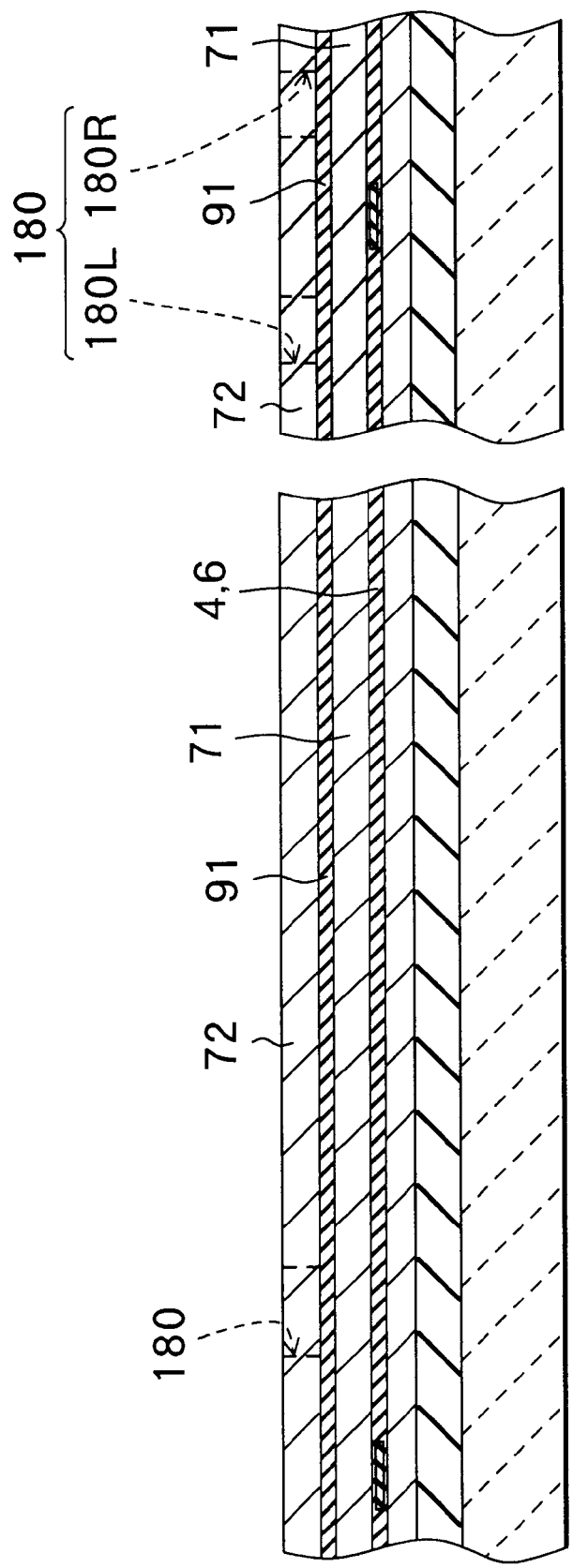

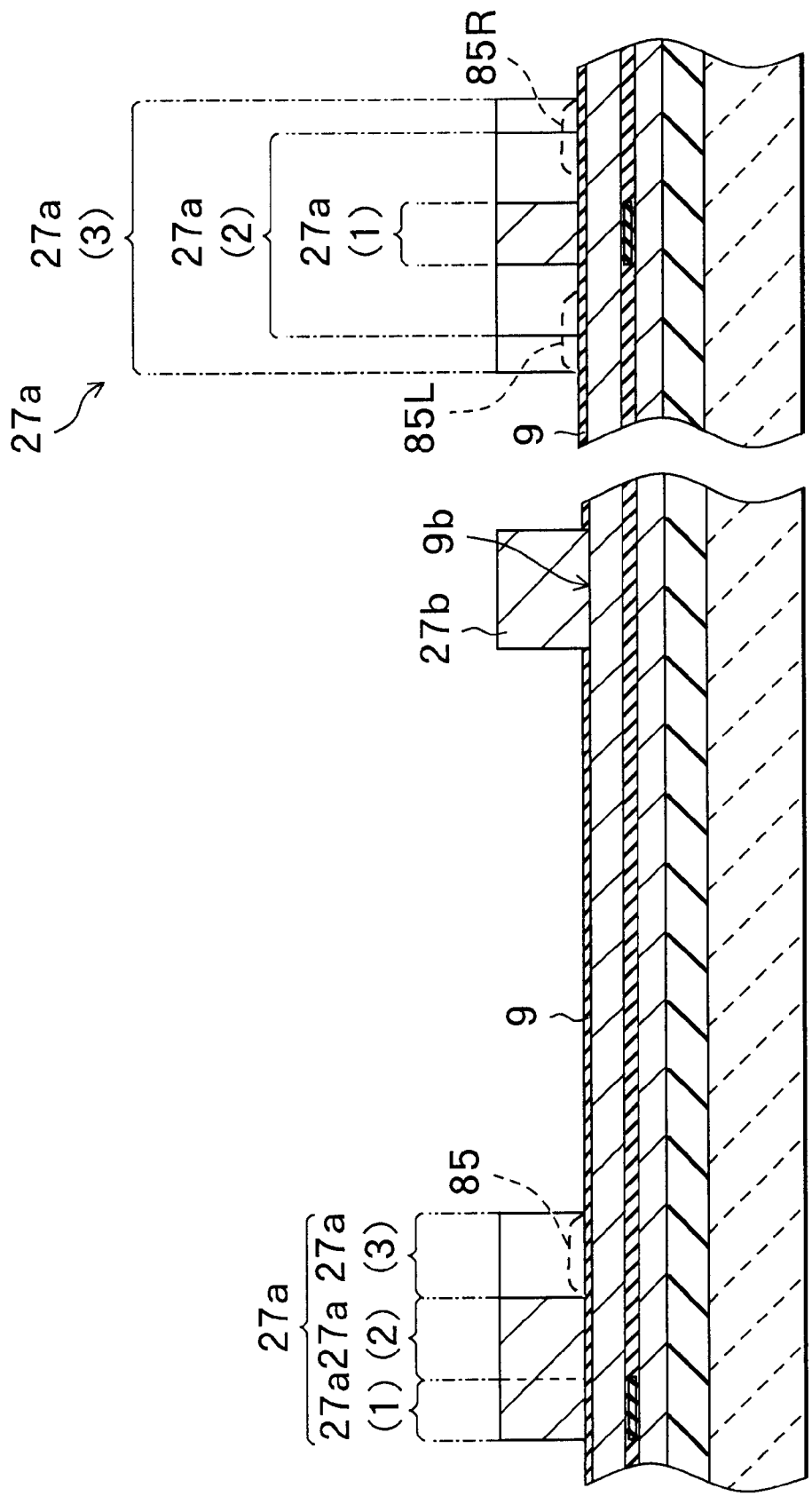

THIN FILM MAGNETIC HEAD HAVING A SHIELD LAYER ADJACENT A GAP LAYER AND METHOD OF MANUFACTURING THE SAME

BACKGROUND OF THE INVENTION

1. Field of the Invention

The present invention relates to a thin film magnetic head having at least an inductive magnetic transducer for writing and a method of manufacturing the same.

2. Description of the Related Art

In recent years, an improvement in performance of a thin film magnetic head is demanded in association with an increase in surface recording density of a hard disk drive. As a thin film magnetic head, a composite thin film magnetic head in which a recording head having an inductive-type magnetic transducer for writing and a reproducing head having a magnetoresistive (hereinbelow, referred to as MR) element for reading are stacked is widely used.

One of factors which determine the performances of the recording head is throat height (TH). The throat height is a length (height) of a magnetic pole from the air bearing surface to the edge of an insulating layer for electrically isolating a thin film coil for generating a magnetic flux. The air bearing surface is a surface of a thin film magnetic head, which faces a magnetic recording medium and is also called a track surface. In order to improve the performances of the recording head, reduction in throat height is desired. The throat height is controlled by a polishing amount at the time of processing the air bearing surface.

In order to improve the recording density in the performances of the recording head, it is necessary to increase track density of a magnetic recording medium. For this purpose, it is necessary to realize a recording head of a narrow track structure in which the width on the air bearing surface of each of a bottom pole and a top pole formed while sandwiching a write gap is reduced to the order of a few microns to submicrons. In order to achieve this, semiconductor processing techniques are used.

Referring now to FIGS. 30 to 35, as an example of a method of manufacturing a conventional thin film magnetic head, a method of manufacturing a composite thin film magnetic head will be described.

According to the manufacturing method, first, as shown in FIG. 30, an insulating layer 102 made of, for example, alumina ($Al_2O_3$) is deposited in thickness of about 5 to 10 $\mu$m on a substrate 101 made of altic ($Al_2O_3$ with TiC) or the like. Subsequently, a bottom shield layer 103 for a reproducing head is formed on the insulating layer 102. For example, alumina is then deposited by sputtering in thickness of 100 to 200 nm on the bottom shield layer 103 to form a shield gap film 104. An MR film 105 for constructing an MR device for reproduction is deposited on the shield gap film 104 and is patterned in a desired shape by high-precision photolithography. Then lead layers (not shown) as lead electrode layers which are electrically connected to the MR film 105 are formed on both sides of the MR film 105. After that, a shield gap film 106 is formed on the lead layers, the shield gap film 104, and the MR film 105, and the MR film 105 is buried in the shield gap films 104 and 106. An upper shield-cum-bottom pole (hereinbelow, referred to as a bottom pole) 107 made of a magnetic material such as Permalloy (NiFe) used for both of the reproducing head and the recording head is formed on the shield gap film 106.

As shown in FIG. 31, on the bottom pole 107, a write gap layer 108 made of an insulating material such as alumina is formed. On the write gap layer 108, a thin film coil 109 for an inductive recording head made of, for example, copper (Cu) is formed by plating or the like. Subsequently, a photoresist layer 110 is formed in a predetermined pattern by high-precision photolithography so as to cover the thin film coil 109. In order to flatten the thin film coil 109 and insulate turns of the thin film coil 109 from each other, a heat treatment is performed at, for example, 250°

As shown in FIG. 32, in a position rearward of the thin film coil 109 (right side in FIG. 32), an opening 108$a$ is formed by partially etching the write gap layer 108 in order to form a magnetic path. Then, a top yoke-cum-top magnetic pole (hereinbelow, called a top pole) 111 made of a magnetic material such as Permalloy for the recording head is selectively formed on the write gap layer 108 and the photoresist layer 110. The top pole 111 is in contact with and magnetically coupled to the bottom pole 107 in the opening 108$a$. The top pole 111 is used as a mask and the write gap layer 108 and the bottom pole 107 are etched by about 0.5 $\mu$m through ion milliing. After that, an overcoat layer 112 made of, for example, alumina is formed on the top pole 111. Finally, a slider is machined to thereby form a track surface (air bearing surface) 120 of the recording head and the reproducing head. In such a manner, a thin film magnetic head is completed.

FIGS. 33 to 35 show the structure of the thin film magnetic head in a completed state. FIG. 33 is a cross section of the thin film magnetic head perpendicular to the air bearing surface 120. FIG. 34 is an enlarged cross section parallel to the air bearing surface 120 of the pole part. FIG. 35 is a plan view. Each of FIGS. 30 to 33 is a cross section taken along line A–A' of FIG. 35. In FIGS. 33 to 35, the overcoat layer 112 is not shown.

In order to improve the performance of the thin film magnetic head, it is important to form the head with accurate throat height TH, apex angle $\theta$, pole width P2W and pole length P2L shown in FIGS. 33 and 34. The apex angle $\theta$ is an angle formed by a straight line which is in contact with a side face on the track face side of the photoresist layer 110 and the top face of the top pole 111. The pole width P2W defines the width of a recording track on a recording medium. The pole length P2L indicates the thickness of the pole. In FIGS. 33 and 35, "TH0 position" denotes the edge on the track face side of the photoresist layer 110 as an insulating layer which electrically isolates the turns of the thin film coil 109, that is, a reference position 0 of the throat height TH.

As shown in FIG. 34, a structure in which side walls of the top pole 111, the write gap layer 108 and a part of the bottom pole 107 are formed vertically in a self-aligned manner is called a trim structure. According to the trim structure, an increase in the effective track width due to expansion of the magnetic flux which occurs at the time of writing data to a narrow track can be prevented. As shown in FIG. 34, lead layers 121 as a lead electrode layer electrically connected to the MR film 105 are provided on both sides of the MR film 105. In FIGS. 30 to 33, the lead layers 121 are omitted.

FIG. 36 shows the structure in plan view of the top pole 111. As shown in the diagram, the top pole 111 has a yoke 111$a$ which occupies a major part of the top pole 111 and a pole tip 111$b$ having an almost constant width W100 as the pole width P2W. In the coupling portion between the yoke 111$a$ and the pole tip 111$b$, the outer periphery of the yoke 111$a$ forms an angle a to a plane parallel to the air bearing surface 120. In the coupling portion, the outer periphery of the pole tip 111$b$ forms an angle $\beta$ to a plane parallel to the air bearing surface 120. For example, a is about 45 degrees and β is 90 degrees. The width of the pole tip 111b defines the width of a recording track on a recording medium. The pole tip 111b includes a portion F on the front side (the air bearing surface 120 side) with respect to the position TH0 and a portion R on the rear side (on the yoke 111a side) with respect to the position TH0. As understood from FIG. 33, the portion F extends on the flat write gap layer 108, and the portion R and the yoke 111a extend on a coil portion (hereinbelow, called an "apex portion" which is covered with the photoresist layer 110 and is raised like a mountain).

The shape of the top pole is described in, for example, Japanese Unexamined Patent Publication No. Hei 8-249614.

Since the pole width P2W determines the track width of the recording head, accurate formation is required. Especially, in recent years, in order to realize high surface density recording, that is, to form a recording head of a narrow track structure, a microfabrication of setting the pole width P2W of the top pole to 1.0 μm or less is demanded.

As a method of forming the top pole, for example, as disclosed in Japanese Unexamined Patent Publication No. Hei 7-262519, a frame plating method is used. In the case of forming the top pole 111 by using the frame plating method, first, a thin electrode film made of, for example, Permalloy is deposited on the whole apex portion by sputtering or the like. A photoresist is then applied on the electrode film and is patterned by a photolithography process to form a frame (outer frame) for plating. By using the electrode film formed before as a seed layer, the top pole 111 is formed by plating.

There is a level difference of, for example, larger than 3 to 4 μm between the apex portion and the other portion. A photoresist is applied on the apex portion in thickness of 3 to 4 μm. When it is assumed that at least 3 μm of thickness of the photoresist on the apex portion is necessary, since the photoresist having fluidity gathers in the lower part, a photoresist film in thickness of, for example, larger than 4 to 6 μm is formed below the apex portion.

In order to form a narrow track as described above, it is necessary to form a frame pattern having a width of about 1.0 μm by a photoresist film. That is, a fine pattern having a width of 1.0 μm or less has to be formed by a photoresist film having a thickness of 4 to 6 μm or more. It is, however, extremely difficult to form such a thick photoresist pattern in width of the narrower pattern in a manufacturing process.

Moreover, at the exposure time of photolithography, light for exposure is reflected by an electrode underlayer as a seed layer. The photoresist also senses the reflection light, so that a deformation or the like occurs in the photoresist pattern and a sharp and accurate photoresist pattern cannot be obtained. As a result, the top pole cannot be formed in a desired shape. For example, the shape of the side walls of the top pole is rounded. Particularly, when the pole width P2W is further reduced to W100A as shown in FIG. 37, it becomes more difficult to obtain the desired width W100A for the following reason. In the portion R extending over the apex portion of the pole tip 111b, the light reflected by the electrode underlayer includes not only reflection light in the vertical direction but also reflection light in the oblique or lateral direction from the inclined face of the apex portion. The reflection light exerts an influence on photosensitivity of the photoresist layer. As a result, the width of the photoresist pattern which defines the pole width P2W becomes wider than an expected value and the shape becomes as shown by solid lines in FIG. 37. In the pole tip 111b, the width of the front portion F with respect to the TH0 position is an extremely important factor of defining the track width on a recording medium. When the width of the portion F becomes wider than the above value W100A, a target fine track width cannot be obtained.

The above-mentioned magnetic head disclosed in Japanese Unexamined Patent Publication No. Hei 8-249614 also has a similar problem. In the magnetic head disclosed in the publication, the width of the magnetic pole changes gently from the TH0 position toward the yoke. Consequently, due to an influence of reflection light in the oblique or lateral direction from the inclined face of the apex portion exerted on the photosensitivity of the photoresist layer, the width of the front portion with respect to the TH0 position cannot be accurately controlled.

As shown in FIG. 37, since the portion R extending from the TH0 position to the coupling portion with the yoke 111a in the pole tip 111b has almost the same width as that of the front portion F with respect to the TH0 position and the cross sectional area of the portion R is small, the magnetic flux from the yoke 111a is saturated in the portion R and cannot sufficiently reach the portion F which defines the track width. As a result, the overwrite characteristic, that is, a characteristic in the case of overwriting data on a recording medium on which data has been already written becomes as low as, for example, about 10 to 20 dB. There is a problem such that a sufficient overwrite characteristic cannot be assured.

SUMMARY OF THE INVENTION

The invention has been achieved in consideration of the problems and its object is to provide a thin film magnetic head, in which the pole width can be accurately controlled and a sufficient overwrite characteristic can be obtained even when the pole width is reduced, and a method of manufacturing the head.

According to the invention, there is provided a thin film magnetic head including: two magnetic layers magnetically coupled to each other and having respectively two magnetic poles which face each other with a gap layer in between in part close to a recording-medium-facing surface facing a recording medium, a thin film coil provided between the two magnetic layers, and an insulating layer for insulating the thin film coil from the two magnetic layers, wherein one of the two magnetic layers includes: a first magnetic portion which extends so as to be apart from the recording-medium-facing surface; and a second magnetic portion which partially overlaps with the first magnetic portion and is magnetically coupled to the first magnetic portion in an overlap region where the first and second magnetic portions overlap with each other, the other magnetic layer in the two magnetic layers extends so as to be apart from the recording-medium-facing surface, and a magnetic shield layer for suppressing propagation of a magnetic flux between the first magnetic and the other magnetic portion is formed in at least the overlap region so as to be adjacent to the gap layer.

According to the invention, there is provided a method of manufacturing a thin film magnetic head including: two magnetic layers magnetically coupled to each other and having respectively two magnetic poles which face each other with a gap layer in between in part close to a recording-medium-facing surface facing a recording medium, a thin film coil provided between the two magnetic layers, and an insulating layer for insulating the thin film coil from the two magnetic layers, the method comprising the steps of: forming one of the two magnetic layers so as to include: a first magnetic portion which extends so as to be apart from the recording-medium-facing surface; and a second magnetic portion which partially overlaps with the first magnetic portion and is magnetically coupled to the first magnetic portion in an overlap region where the first and second magnetic portions overlap with each other; forming the other magnetic layer of the two magnetic layers which extends so as to be apart from the recording-medium-facing surface; and forming a magnetic shield layer for suppressing propagation of a magnetic flux between the first magnetic portion and the other magnetic layer at least in an overlap region so as to be adjacent to the gap layer.

In the thin film magnetic head of the invention, the second magnetic portion in one of the magnetic layers overlaps with a part of the first magnetic portion, and thereby the first and second magnetic portions are magnetically coupled. By the magnetic shield layer formed in the overlap region in which the first and second magnetic portions overlap with each other so as to be adjacent to the gap layer, the propagation of the magnetic flux between the first magnetic portion and the other magnetic layer is suppressed.

In the method of manufacturing the thin film magnetic head of the invention, it is also possible that the other magnetic layer is formed as a single layer, a recess is selectively formed in a part of the other magnetic layer formed, and the magnetic shield layer is buried in the recess. Alternatively, the other magnetic layer is formed so as to have a stacked structure made by a plurality of layers, at least an opening is selectively formed in a layer adjacent to the gap layer upon formation of the stacked structure, and the magnetic shield layer is buried in the opening.

In the thin film magnetic head or the method of manufacturing the head of the invention, the magnetic shield layer may be formed so as to have the shape in plane corresponding to that of the overlap region.

In the thin film magnetic head or the method of manufacturing the head of the invention, the magnetic shield layer may be formed in a part of the other magnetic layer.

In the thin film magnetic head or the method of manufacturing the head of the invention, the magnetic shield layer may be formed in a in a part of the first magnetic portion.

In the thin film magnetic head or the method of manufacturing the head of the invention, the first magnetic portion comprises: a track width defining portion which extends with constant width so as to be apart from the recording-medium-facing surface and defines a recording track width of the recording medium; two or more connection portions which are magnetically coupled to a part of the second magnetic portion and are disposed so as to be apart from each other in the track width direction; and an intermediate coupling portion which has an edge for defining an edge on the recording-medium-facing surface of the insulating layer and magnetically couples the track width defining portion and the two or more connection portions, and the two or more connection portions and the second magnetic portion may overlap with each other in the overlap region.

In the thin film magnetic head or the method manufacturing the head of the invention, the magnetic shield layer may be formed so that the position of its edge on the recording-medium-facing surface side either coincides with the position of the edge on the recording-medium-facing surface side in the intermediate coupling portion of the first magnetic portion or is deviated from the position so as to be apart from the recording-medium-facing surface.

In the thin film magnetic head of the invention, a step in the width direction may be formed in a position where the track width defining portion and the intermediate coupling portion in the first magnetic portion are coupled to each other, in such a manner that the width of the track width defining portion is narrower than the width of the intermediate coupling portion at the coupling position. In this case, a step face of the intermediate coupling portion in the step may be substantially perpendicular to the extending direction of the track width defining portion.

In the thin film magnetic head according to the invention, it is preferable to form the first magnetic portion so that the width of the intermediate coupling portion is narrower than that of the connection region defined by the two or more connection portions, at the position where the intermediate coupling portion and the two or more connection portions are coupled to each other.

In the thin film magnetic head or the method of manufacturing the head of the invention, one of the magnetic layers may be further provided with a third magnetic portion which is formed between the first and second magnetic portions and magnetically couples the first and second magnetic portions together. In this case, it is preferable to dispose the third magnetic portion so as to overlap with both a part of the first magnetic portion and a part of the second magnetic portion.

According to the invention, a method of manufacturing a thin film magnetic head including: first and second magnetic layers magnetically coupled to each other and having respectively two magnetic poles which face each other with a gap layer in between in part close to a recording-medium-facing surface facing a recording medium, a thin film coil provided between the two magnetic layers, and an insulating layer for insulating the thin film coil from the two magnetic layers, the method may comprise the steps of forming the first magnetic layer as a single layer; forming a recess in the thickness direction in a part of the first magnetic layer; forming a magnetic shield layer by burying a non-magnetic material in the recess of the first magnetic layer; forming the gap layer so as to cover at least the surface of each of the first magnetic layer and the magnetic shield layer; selectively forming the first magnetic portion serving as a part of the second magnetic layer in a predetermined region on the gap layer; forming the thin film coil in a region where the first magnetic portion is not formed in an upper region of the gap layer; forming the insulating layer so as to cover the thin film coil; and selectively forming a second magnetic portion as another part of the second magnetic layer on the insulating layer and the first magnetic portion so as to partially overlap with and so as to be magnetically coupled with the first magnetic portion in a region corresponding to the region in which the magnetic shield layer is formed.

According to the invention, a method of manufacturing a thin film magnetic head including: first and second magnetic layers magnetically coupled to each other and having respectively two magnetic poles which face each other with a gap layer in between in part close to a recording-medium-facing surface facing a recording medium, a thin film coil provided between the two magnetic layers, and an insulating layer for insulating the thin film coil from the two magnetic layers, the method may comprise the steps of: forming the first magnetic layer as a stack structure having an opening in a predetermined region in at least the uppermost layer; forming a magnetic shield layer by filling the opening in the uppermost layer in the first magnetic layer with a non-magnetic material; forming the gap layer so as to cover the surfaces of the first magnetic layer and the magnetic shield layer; selectively forming the first magnetic portion serving as a part of the second magnetic layer in a predetermined region on the gap layer; forming the thin film coil in a region where the first magnetic portion is not formed; forming the insulating layer so as to cover the thin film coil; and selectively forming a second magnetic portion as another part of the second magnetic layer on the insulating layer and the first magnetic portion so as to partially overlap with and so as to be magnetically coupled with the first magnetic portion in a region corresponding to the region in which the magnetic shield layer is formed.

According to the invention, a method of manufacturing a thin film magnetic head including: first and second magnetic layers magnetically coupled to each other and having respectively two magnetic poles which face each other with a gap layer in between in part close to a recording-medium-facing surface facing a recording medium, a thin film coil provided between the two magnetic layers, and an insulating layer for insulating the thin film coil from the two magnetic layers, the method may comprise the steps of. forming the first magnetic layer; forming the gap layer so as to cover the surfaces of the first magnetic layer; selectively forming a magnetic shield layer made of a non-magnetic material on the gap layer; selectively forming a first magnetic portion serving as a part of the second magnetic layer on the gap layer so that its part covers the magnetic shield layer; forming the thin film coil in a region where the first magnetic portion is not formed; forming the insulating layer so as to cover the thin film coil; and selectively forming a second magnetic portion as another part of the second magnetic layer on the insulating layer and the first magnetic portion so as to partially overlap with and so as to be magnetically coupled with the first magnetic portion in a region corresponding to the region in which the magnetic shield layer is formed.

Other and further objects, features and advantages of the invention will appear more fully from the following description.

BRIEF DESCRIPTION OF THE DRAWINGS

FIGS. 1A and 1B are cross sections for explaining a process in a method of manufacturing a thin film magnetic head according to a first embodiment of the invention.

FIGS. 2A and 2B are cross sections for explaining a process subsequent to FIGS. 1A and 1B, respectively.

FIGS. 3A and 3B are cross sections for explaining a process subsequent to FIGS. 2A and 2B, respectively.

FIGS. 5A and 5B are cross sections for explaining a process subsequent to FIGS. 4A and 4R, respectively.

FIGS. 19A and 19B are cross sections showing a modification of the process in the method of manufacturing a thin film magnetic head according to the first embodiment of the invention shown in FIG. 2.

FIGS. 20A and 20B are cross sections showing another modification of the process in the method of manufacturing a thin film magnetic head according to the first embodiment of the invention shown in FIG. 2.

FIGS. 22A and 22B are cross sections for explaining a process subsequent to FIGS. 21A and 21B, respectively.

DETAILED DESCRIPTION OF THE PREFERRED EMBODIMENTS

Figures 4A, 4B:
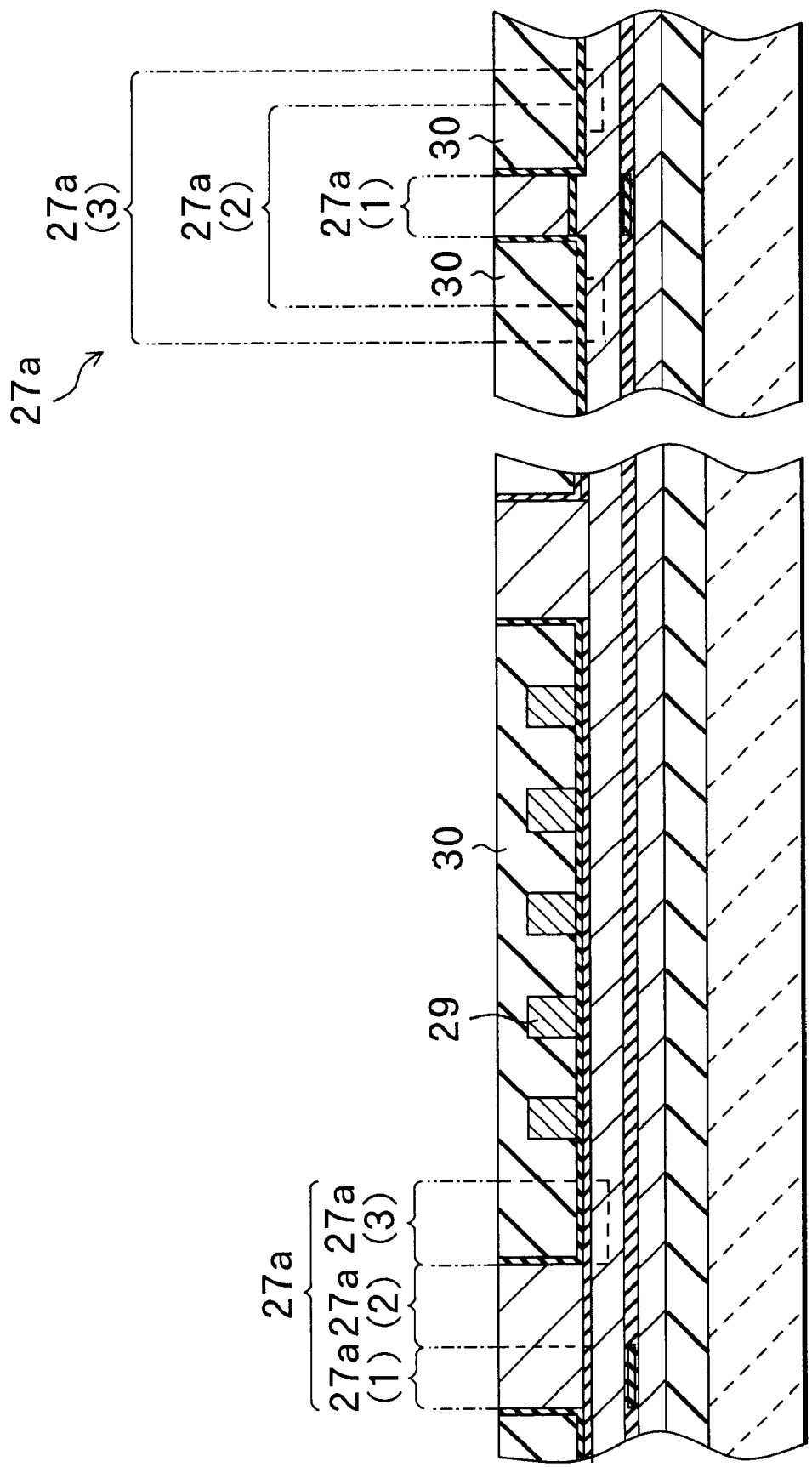
FIGS. 4A and 4B are cross sections for explaining a process subsequent to FIGS. 3A and 3B, respectively.

Embodiments of the invention will be described in detail hereinbelow by referring to the drawings.

First Embodiment
<<Method of manufacturing thin film magnetic head>>

Figure 6:
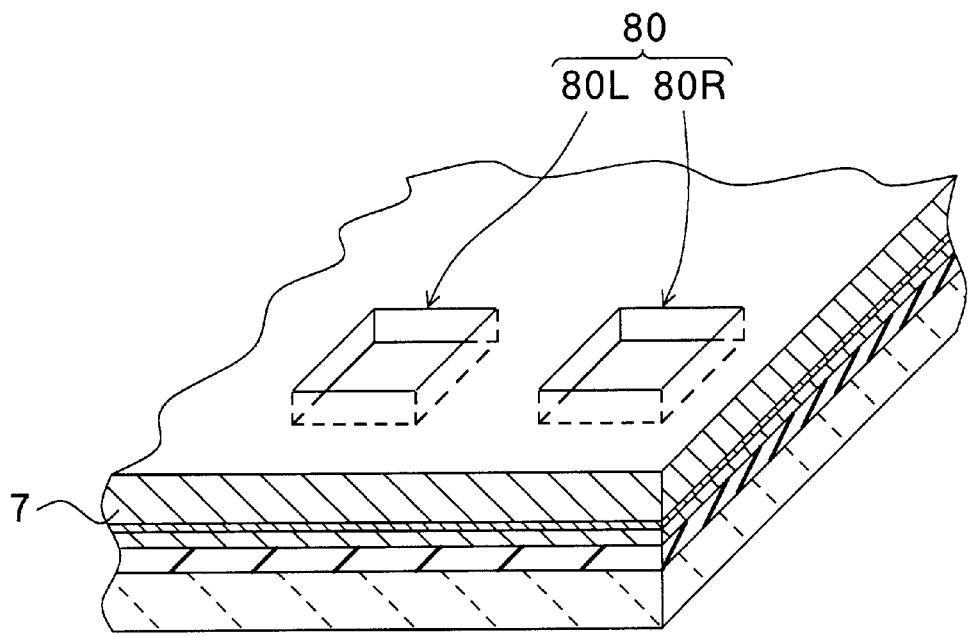
FIG. 6 is a perspective view corresponding to the cross sections of FIGS. 2A and 2B.
Figure 7:
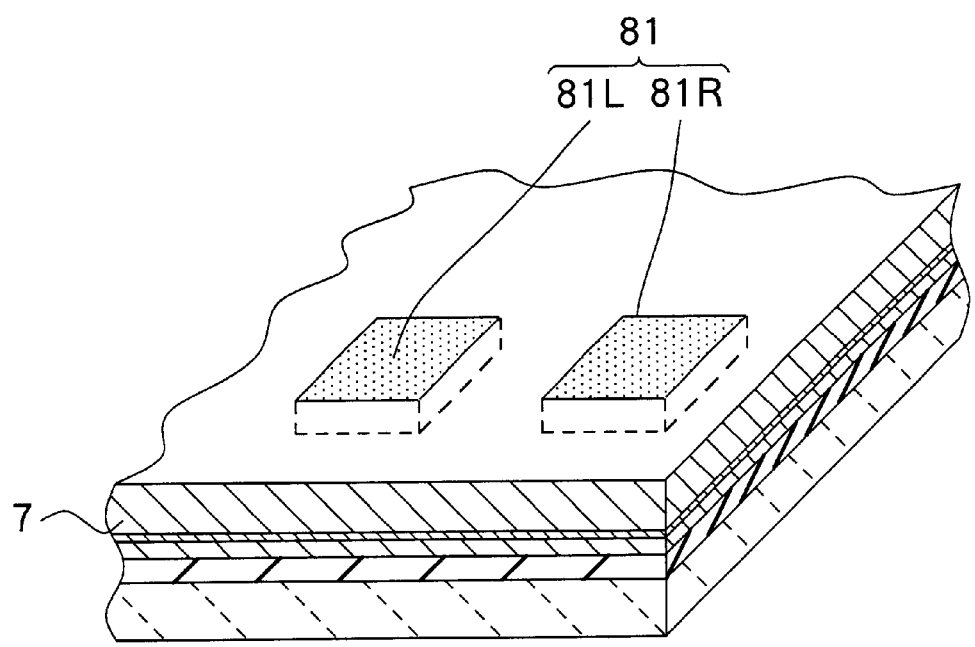
FIG. 7 is a perspective view corresponding to the cross sections of FIGS. 2A and 2B.
Figure 8:
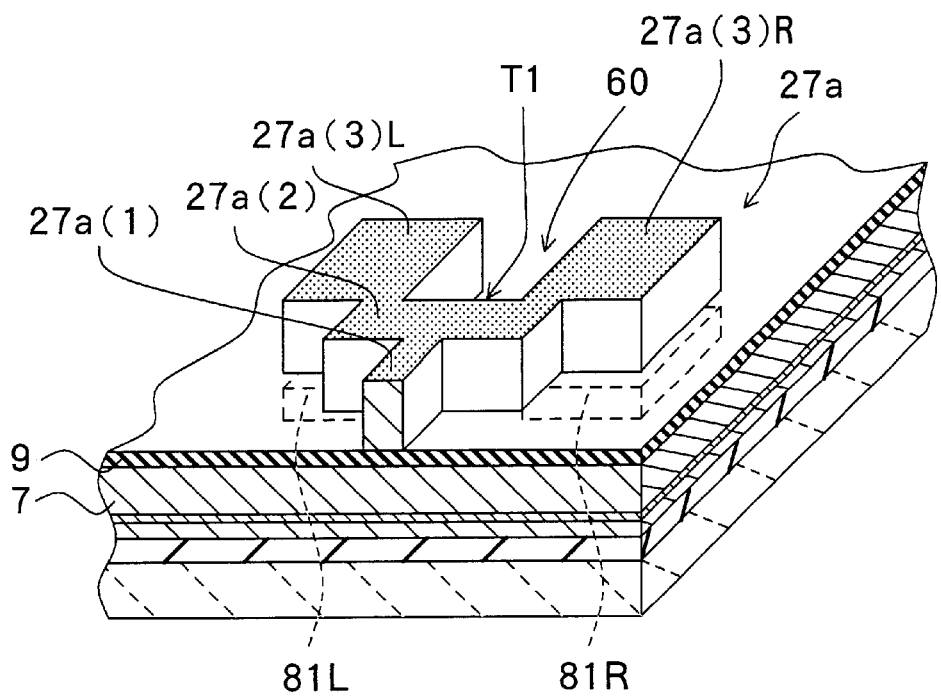
FIG. 8 is a perspective view corresponding to the cross sections of FIGS. 3A and 3B.
Figure 9:
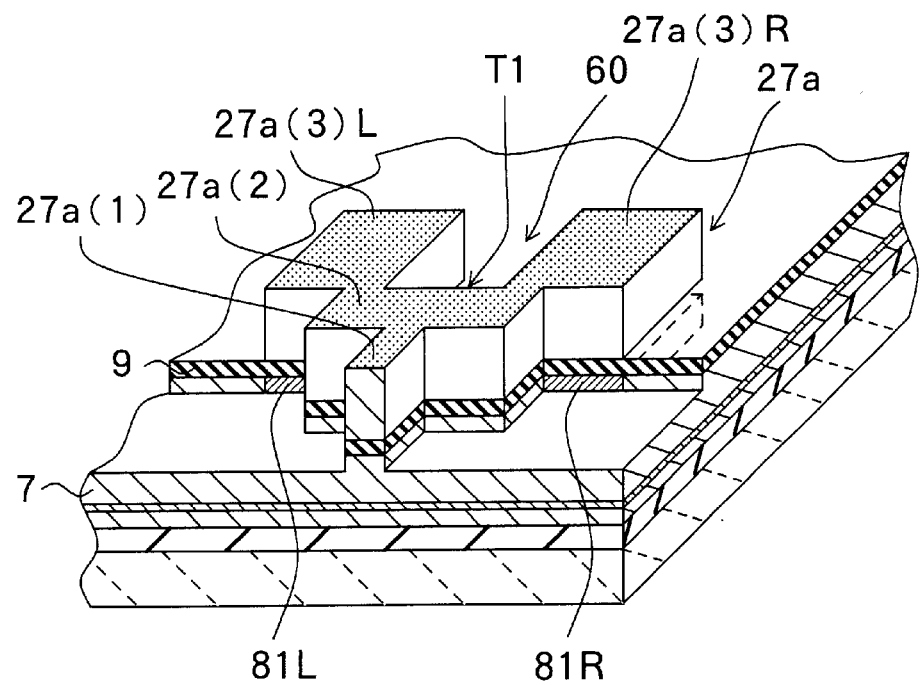
FIG. 9 is a perspective view corresponding to the cross sections of FIGS. 3A and 3B.

Referring to FIGS. 1A and 1B to FIG. 9, a method of manufacturing a composite thin film magnetic head as a method of manufacturing a thin film magnetic head according to the first embodiment of the invention will be described. Since a thin film magnetic head according to the embodiment will be embodied by the method of manufacturing the thin film magnetic head according to the embodiment, it will be also described hereinbelow. FIGS. 1A to 5A are cross sections each of which is perpendicular to the air bearing surface and FIGS. 1B to 5B are cross sections each of which is parallel to the air bearing surface of the pole part. FIGS. 6 to 9 are perspective views in the manufacturing processes of the embodiment. FIG. 6 corresponds to the state at an intermediate stage between the process illustrated in FIGS. 1A and 1B and the process illustrated in FIGS. 2A and 2B. FIG. 7 corresponds to the state of FIGS. 2A and 2B. FIGS. 8 and 9 correspond to the state at an intermediate stage between the process shown in FIGS. 2A and 2B and the process shown in FIGS. 3A and 3B.

In the following, for example, in FIG. 1B, the distance in the lateral direction of the drawing among directions parallel to the air bearing surface will be described as "width". For example, in FIG. 1A, the distance in the direction perpendicular to the air bearing surface (the lateral direction of the drawing) will be described as "length". For example, the distance in the vertical direction of FIGS. 1A and 1B will be described as "thickness" or "depth". Further, for example, in FIG. 1A, the side close to the air bearing surface in the "length" direction (left side in the drawing) will be described as "front side (or forward)" and, on the other hand, the side far from the air bearing surface (right side in the drawing) will be described as "rear side (rearward)".

In the manufacturing method according to the embodiment, first, as shown in FIGS. 1A and 1B, an insulating layer 2 made of, for example, alumina ($Al_2O_3$) is deposited in thickness of about 3 to 5 $\mu$m on a substrate 1 made of, for example, attic ($Al_2O_3$. TiC). Then, a bottom shield layer 3 for the reproducing head is formed by selectively depositing, for example, Permalloy (NiFe) in thickness of about 3 $\mu$m on the insulating layer 2 by plating by using the photoresist film as a mask.

Subsequently, a shield gap film 4 is formed by depositing alumina or the like in thickness of about 10 to 20 nm by sputtering on the bottom shield layer 3. An MR film 5 for constructing an MR device for reproducing is formed on the shield gap film 4 in a desired shape by high-precision photolithography. Lead layers (not shown) as a lead electrode layer to be electrically connected to the MR film 5 are formed on both sides of the MR film 5 and, after that, a shield gap film 6 is formed on the lead layers, the shield gap film 4, and the MR film 5, and thereby the MR film 5 is buried in the shield gap films 4 and 6. Then, an upper-shield-cum-bottom pole (hereinbelow, simply called a "bottom pole") 7 made of, for example, Permalloy is selectively deposited in thickness of about 3 to 4 $\mu$m on the shield gap film 6 by, for example, electroplating. The bottom pole 7 corresponds to an example of "other magnetic layer" in the invention.

As shown in FIGS. 2A and 2B and FIG. 6, in a predetermined position on the bottom pole 7, the surface of the bottom pole 7 in the position is patterned in a predetermined shape in plane by using a photoresist film (not shown) by, for example, high precision photolithography. After that, a part that is not masked with the photoresist in the bottom pole 7 is partially removed by about 0.5 to 1.5 $\mu$m by, for example, etching, and thereby a recess 80 is formed. As shown in FIGS. 2B and 6, the recess 80 is comprised of two recessed areas; a right recess 80R and a left recess 80L.

The "predetermined position" and the "predetermined shape in plane" will be explained hereinbelow.

Figure 11:
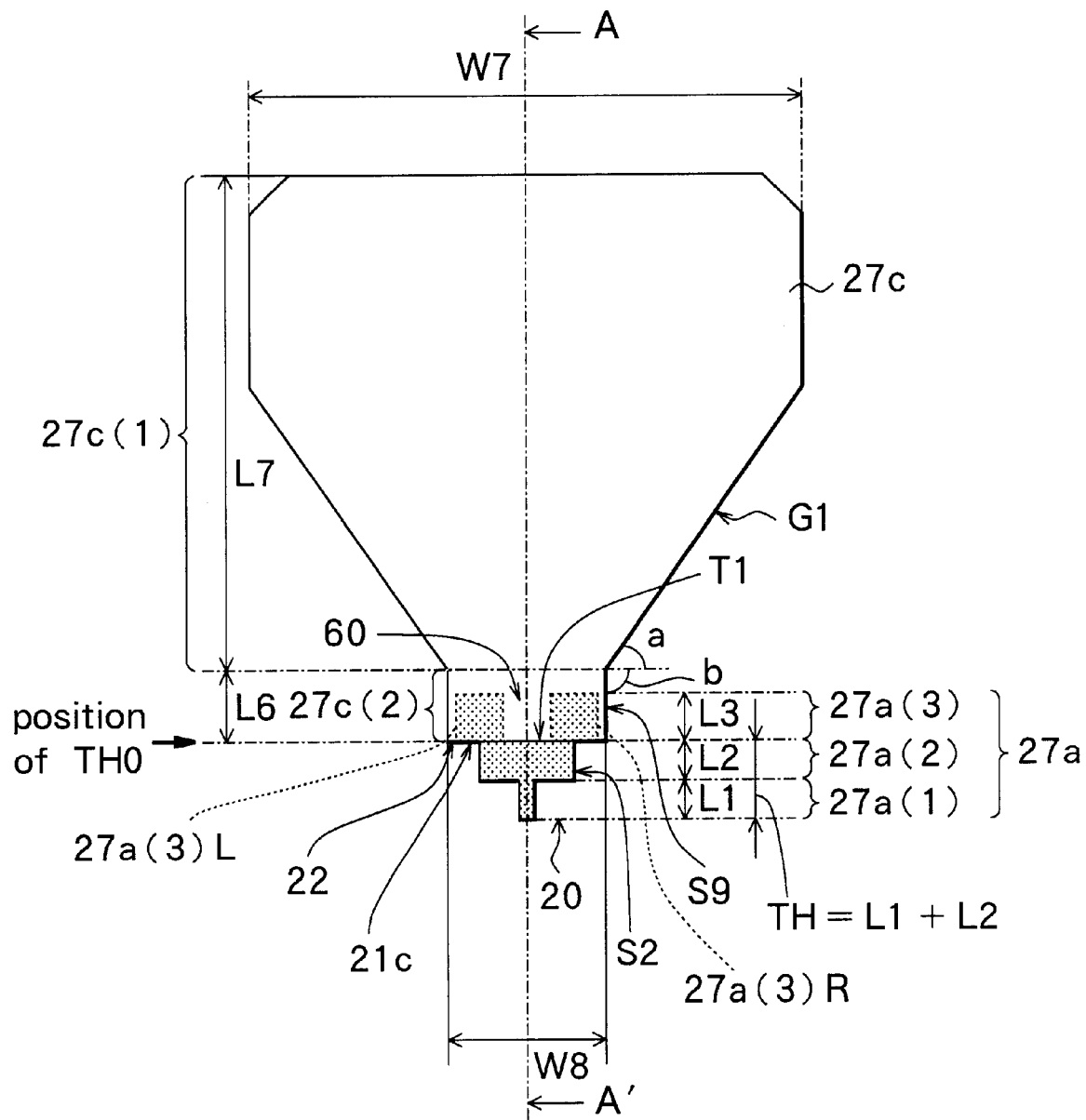
FIG. 11 is a plan view showing the structure of a top pole and a top pole tip of the thin film magnetic head according to the first embodiment of the invention.

First, the "predetermined position" will be described. The "predetermined position" on the bottom pole 7 at the time of forming the recess 80 is, for example, a position corresponding to a position in which a part of a top pole tip 27a having the shape in plane as shown in FIG. 11 as will be described hereinlater is to be formed on the bottom pole 7 in a following process. As shown in FIG. 11, the top pole tip 27a is formed in a following process so as to include, for example, a front end portion 27a(1), an intermediate coupling portion 27a(2) and a connection portion 27a(3). In the method of manufacturing the thin film magnetic head according to the embodiment, as shown in FIGS. 3A and 3B and FIG. 8, a specific position in which the recess 80 is formed (that is, the "predetermined position") corresponds to, for example, a position in which the connection portion 27a(3) in the top pole tip 27a is formed. In the case where the connection portion 27a(3) is comprised of a right connection portion 27a(3)R and a left connection portion 27a(3)L as shown in FIG. 11, it is arranged so that the forming positions of the right and left recesses 80R and 80L correspond to the forming positions of the right and left connection portions 27a(3)R and 27a(3)L, respectively.

Subsequently, the "predetermined shape in plane" will be explained. Upon formation of the recess 80, the "predetermined shape in plane" patterned in the surface of the bottom pole 7 with the photoresist film corresponds to the shape in plane of the connection portion 27a(3) in the top pole tip 27a shown in FIG. 11. It is arranged so that the shapes in plane of the right and left recesses 80R and 80L correspond to those of the right and left connection portions 27a(3)R and 27a(3)L, respectively. The recess 80 shown in FIGS. 2A and 2B and FIG. 6 is a recess in a case when, for example, each of the right and left connection portions 27a(3)R and 27a(3)L is a rectangular shape in plane, and the area of the portion 27a(3)R and that of 27a(3)L are the same. The recess 80 is formed so as to have the characteristics in shape in a manner similar to the above. The dimensions of the shape in plane of the recess 80 are set to those of the shape in plane of the connection portion 27a(3) which will be described hereinbelow.

Referring again to FIGS. 2A and 2B, the method of manufacturing the thin film magnetic head in the embodiment will be described. As shown in FIGS. 2A and 2B, after forming the recess 80, an insulating film (not shown) made of alumina or the like is formed on the whole surface in thickness of about 3.0 to 4.0 $\mu$m. At this time, the recess 80 is buried by a part of the not-shown insulating film.

As shown in FIGS. 2A and 2B and FIG. 7, the surface of the insulating film is polished until the surface of the bottom pole 7 is exposed by, for example, CMP (Chemical Mechanical Polishing) to planarize the whole surface. By the operation, the insulating layer except for the portion burying the recess 80 and the bottom pole 7 is removed. As a result, the insulating portion burying the recess 80, that is, a magnetic shield layer 81 and the insulating portion burying the bottom pole 7 remain. The magnetic shield layer 81 is comprised of a right magnetic shield layer 81R for burying the right recess 80R and a left magnetic shield layer 81L for burying the left recess 80L. The right and left magnetic shield layers 81R and 81L have shapes in plane corresponding to the right and left connection portions 27a(3)R and 27a(3)L of the top pole tip 27a, respectively.

As shown in FIGS. 3A and 3B and FIG. 8, a write gap layer 9 made of alumina or the like is formed on the whole surface in thickness of about 0.15 to 0.3 μm. After that, in a position rearward of a region in which a thin film coil 29 is formed in a later step, an opening 9b is formed by partially etching the write gap layer 9 in order to form a magnetic path. Subsequently, in a position forward of a region in which the thin film coil 29 is formed in a later step, the top pole tip 27a as a part of the top pole is selectively formed on the write gap layer 9 by, for example, electroplating. At this time, it is arranged so that the forming position of the connection portion 27a(3) in the top pole tip 27a coincides with the forming position of the magnetic shield layer 81. Consequently, the right magnetic shield layer 81R faces the right connection portion 27a(3)R with the write gap layer 9 in between, and the left magnetic shield layer 81L faces the left connection portion 27a(3)L with the write gap layer 9 in between. Upon formation of the top pole tip 27a, a magnetic path forming pattern 27b is also formed in the opening 9b. The top pole tip 27a and the magnetic path forming pattern 27b are made of, for example, a Permalloy (NiFe) alloy or an iron nitride (FeN) alloy as a material having high saturation magnetic flux density. The top pole tip 27a corresponds to an example of "first magnetic layer portion in one of magnetic layers" in the invention.

The top pole tip 27a and the magnetic path forming pattern 27b are formed, for example, as follows. First, an NiFe alloy as a material having high saturated magnetic flux density is deposited in thickness of about 70 nm by, for example, sputtering to thereby form an electrode film (not shown) serving as a seed layer in electroplating. A photoresist is applied on the electrode film and is patterned by photolithography, thereby forming a photoresist pattern (not shown) by a frame plating method. Then, by using the photoresist pattern as a mask and using the electrode film formed before as a seed layer, the top pole tip 27a and the magnetic path forming pattern 27b are formed by electroplating and, after that, the photoresist pattern is removed.

As shown in FIGS. 3A and 3B and FIG. 9, for example, by dry etching in RIE using a chlorine gas ($Cl_2$, $CF_4$, $BCl_2$, $SF_6$ or the like) and using a photoresist film (not shown) selectively formed in the region rearward of the connection portion 27a(3) of the top pole tip 27a and the front end portion 27a(1) and the intermediate coupling portion 27a(2) in the top pole tip 27a as a mask, the write gap layer 9 and the bottom pole 7 around it are etched by about 0.5 μm in a self-aligned manner, thereby forming a trim structure. For example, as shown in FIG. 9, the rear edge position of the range of the etching process coincides with the position of the edge face T1 of the top pole tip 27a shown in FIG. 10 which will be described hereinlater. In the rear edge face of the etching process range, a part of the right and left magnetic shield layers 81R and 81L is exposed. In FIG. 3B, the edge face on the front side of the intermediate coupling portion 27a(2) and the connection portion 27a(3) in the top pole tip 27a after forming the trim structure is not illustrated.

As shown in FIGS. 3A and 3B, an insulating film 28 such as an alumina film is formed in thickness of about 0.5 to 1.5 μm on the whole surface.

As shown in FIGS. 4A and 4B, the thin film coil 29 for an inductive recording head made of copper (Cu) or the like is formed in thickness of about 2 to 3 μm by, for example, electroplating in a recessed region which is positioned between the top pole tip 27a and the magnetic path forming pattern 27b and is surrounded by the insulating film 28. Then, an insulating layer 30 such as an alumina film is formed in thickness of about 3 to 4 μm on the whole surface to bury the thin film coil 29 and, after that, the whole surface is polished by, for example, CMP. At this time, the surface of the insulating layer 30 is polished by the CMP until the surface of each of the top pole tip 27a and the magnetic path forming pattern 27b is exposed. By the polishing process, the surface of each of the top pole tip 27a, insulating layer 30 and magnetic path forming pattern 27b is planarized.

Subsequently, as shown in FIGS. 5A and 5B, by electroplating similar to that in the case of the top pole tip 27a and the magnetic path forming pattern 27b, a top-yoke-cum-top pole (hereinbelow, simply called a "top pole") 27c is formed in thickness of about 3 to 4 μm. The top pole 27c has a shape in plane, for example, as shown in FIG. 11. The characteristics of the shape of the top pole 27c will be described hereinlater. As shown in FIGS. 5A and 5B, the top pole 27c is magnetically coupled to the bottom pole 7 via the magnetic path forming pattern 27b in the opening 9b and is also magnetically coupled to the connection portion 27a(3) in the top pole tip 27a. The material and the forming method of the top pole 27c are, for example, similar to those of the top pole tip 27a. The top pole 27c corresponds to an example of "second magnetic layer portion in one of magnetic layers" in the invention.

Subsequently, as shown in FIGS. 5A and 5B, an overcoat layer 31 made of alumina or the like is formed so as to cover the whole surface. Finally, a slider is machined to thereby form an air bearing surface (track surface) 20 of each of the recording head and the reproducing head. In such a manner, a thin film magnetic head is completed.

<<Construction of Main Portion of Thin Film Magnetic Head>>

A characteristic part of the structure of the thin film magnetic head according to the embodiment will be mainly explained.

Figure 10:
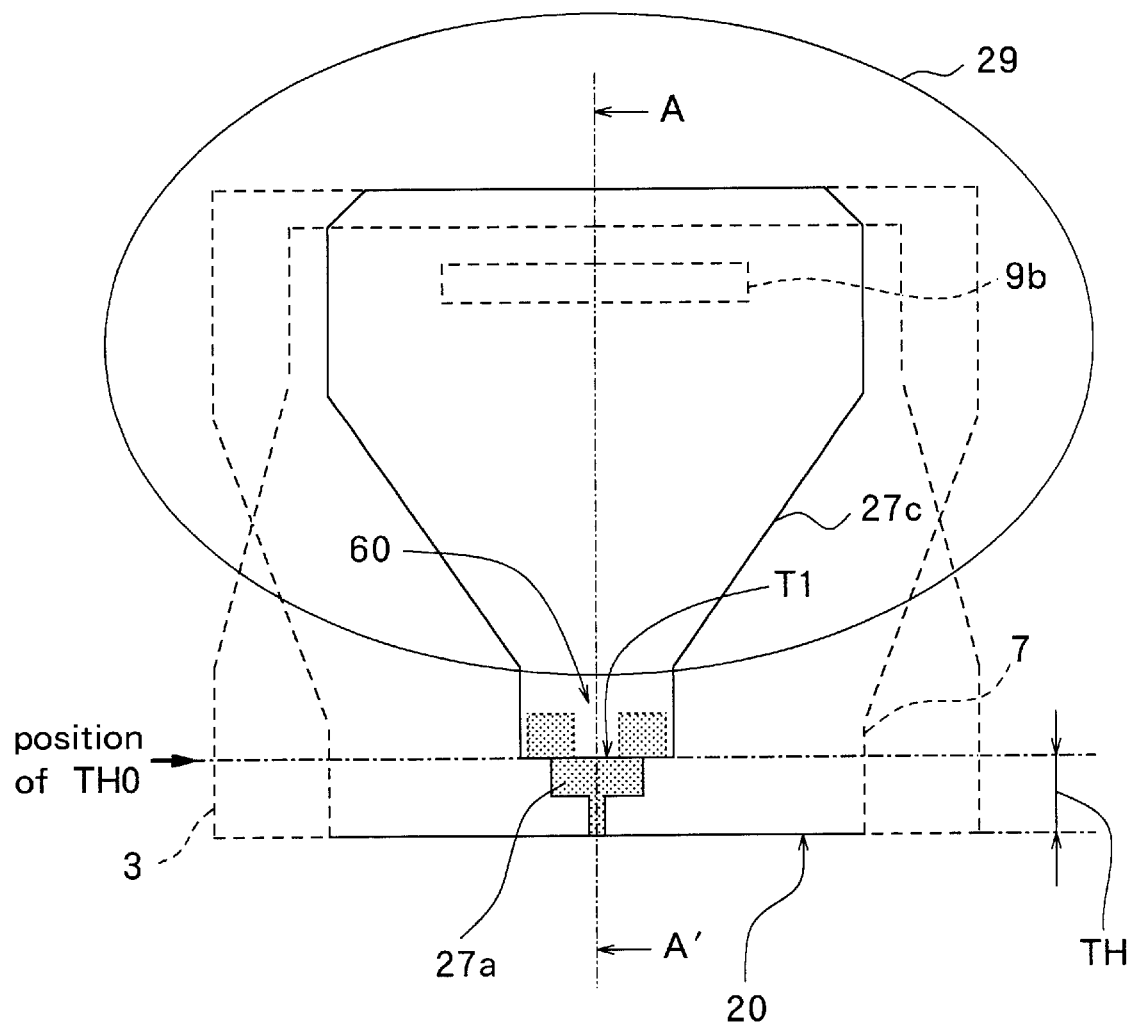
FIG. 10 is a plan view showing the structure of the thin film magnetic head according to the first embodiment of the invention.

FIG. 10 schematically shows the structure in plane of a thin film magnetic head manufactured by a manufacturing method according to the embodiment. In the drawing, the insulating layer 30, the overcoat layer 31 and the like are not shown. With respect to the thin film coil 29, only the outermost periphery is shown. As shown in FIG. 10, a throat height TH is defined as a length from the position of an edge face T1 which defines the position of an edge closest to the air bearing surface 20 in the insulating layer 30 formed on the rear side of the top pole tip 27a to the air bearing surface 20. That is, the position of the edge face Ti corresponds to a position where the throat height TH is zero (hereinbelow, called a "TH0 position"). The air bearing surface 20 and the edge face T1 are almost parallel to each other. FIG. 5A is a cross section taken along line A–A' in FIG. 10.

Figure 12:
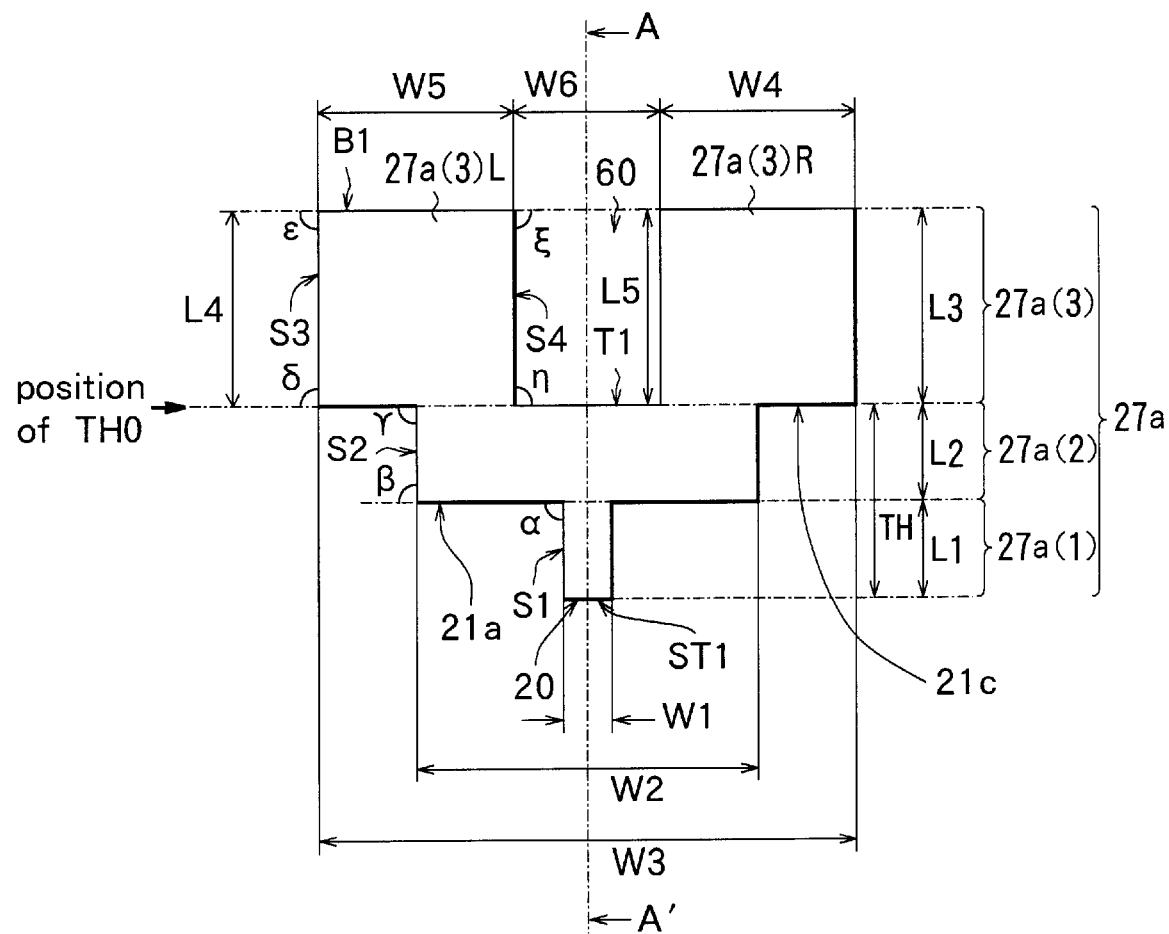
FIG. 12 is a plan view enlargedly showing the structure of the top pole tip in FIG. 11.

FIG. 11 shows a structure in plane of the top pole 27c and the top pole tip 27a and FIG. 12 enlargedly shows the structure in plane of the top pole tip 27a. As shown in FIG. 11, the top pole 27c comprises a yoke 27c(1) which has width W7 and length L7 and occupies the majority of the top pole 27c and a connection portion 27c(2) which has width W8 and length L6 and is connected to the top pole tip 27a so as to be partially overlapped with each other. The width W7 of the yoke 27c(1) is wider than the width W8 of the connection portion 27c(2) (W7>W8). The center in the width direction of the yoke 27c(1) and that of the connection portion 27c(2) coincide with each other. The width W8 of the connection portion 27c(2) hardly varies according to positions. The outer edge G1 of the yoke 27c(i) and a plane parallel to the air bearing surface 20 form an angle 'a'. A side face S9 of the connection portion 27c(2) forms an angle 'b' to a plane parallel to the air bearing surface 20. In the embodiment, the angle 'a' is preferably, for example, 30 to 60 degrees. More preferably, the angle 'a' is 45 degrees. The angle 'b' is preferably, for example, about 90 degrees.

As shown in FIG. 12, the top pole tip 27a comprises the front end portion 27a(1) which has a width of W1 and defines the write track width on a recording medium, the intermediate coupling portion 27a(2) having an almost constant width of W2 which is wider than W1, and the connection portion 27a(3) having an almost constant width of W3 which is wider than W2 (W3>W2>W1). The length of the front end portion 27a(1) is L1 and the length of the intermediate coupling portion 27a(2) is L2. The center in the width direction of the front end portion 27a(1) and that of the intermediate coupling portion 27a(2) coincide with each other.

The connection portion 27a(3) is comprised of, for example, the connection portion 27a(3)R and the connection portion 27a(3)L which are positioned symmetrically with respect to a line segment (A–A' line) extending in the center of the front end portion 27a(1) and the intermediate coupling portion 27a(2) on the rear side of the intermediate coupling portion 27a(2). The connection portion 27a(3)R has a width of W4 and a length of L3. The connection portion 27a(3)L has a width of W5 and a length of L4. Preferably, W4 is set to be equal to W5 and L3 is set to be equal to L4 so that the area of the connection portion 27a(3)R and that of the connection portion 27a(3)L are equal to each other. In the following, description will be given on the assumption that W4=W5 and L3=L4. The length of the connection portion 27a(3) will be referred to as L3. The center in the width direction of the connection portion 27a(3) and that of each of the front end portion 27a(1) and the intermediate coupling portion 27a(2) coincide with each other.

The top pole tip 27a shown in FIG. 12 has a region which is recessed in the longitudinal direction (hereinbelow, simply called a "recess 60") in a portion surrounded by the edge face T1 and the connection portions 27a(3)R and 27a(3)L. The recess 60 has, for example, a shape constructed by straight lines and is, for example, a part of a rectangle. The width of the recess 60 is W6 and the length is L5. In the top pole tip 27a shown in FIG. 12, for example, the length L5 of the recess 60 and the length L3 of the connection portion 27a(3) are equal to each other (L3=L5). The width W3 of the connection portion 27a(3) is equal to the sum of the width W4 of the connection portion 27a(3)R, the width W6 of the recess 60, and the width W5 of the connection portion 27a(3)L (W4+W6+W5=W3). As described above, the position of the edge face T1 corresponds to the TH0 position. The position of the edge face T1 is determined by changing and adjusting the shape of the recess 60 when the top pole tip 27a is formed. Consequently, at the time of formation of the top pole tip 27a, the length from the edge face Ti to the air bearing surface 20, that is, the throat height TH can be freely set.

In the position where the front end portion 27a(1) and the intermediate coupling portion 27a(2) are coupled to each other (hereinbelow, called "first coupling position"), the width of the front end portion 27a(1) is W1 and the width of the intermediate coupling portion 27a(2) is W2 which is wider than W1. That is, a step in the width direction exists in the first coupling position. An end face (hereinbelow, referred to as "step face") 21a on the side of the intermediate coupling portion 27a(2) in the step and a side face S1 of the front end portion 27a(1) form an angle a and a side face S2 of the intermediate coupling portion 27a(2) and an extending direction of the step face 21a form an angle β. In the embodiment, each of the angles ⊕ and β is equal to, for example, 90 degrees. That is, the step face 21a existing between the front end portion 27a(1) and the intermediate coupling portion 27a(2) is substantially perpendicular to the side face S1 of the front end portion 27a(1). "Substantially perpendicular" denotes here that the angle a formed between the main portion of the side face S1 of the front end portion 27a(1) and the main portion of the step face 21a is almost 90 degrees and also denotes not only the case where the corner formed by the side face S1 of the front end portion 27a(l) and the step face 21a is a sharp edge but also the case where the corner is rounded (for example, the corner has a shape shown by broken lines in FIG. 14 which will be described hereinlater). Preferably, the angle a lies, for instance, within the range from 75 to 120 degrees.

The corner formed by the side face S1 of the front end portion 27a(1) in the top pole tip 27a and the step face 21a can be rounded even when the portion corresponding to the corner in a mask for forming a photoresist pattern has a sharp edge. Even if the angle of the portion corresponding to the first corner portion in the mask for forming a photoresist pattern is set accurately 90 degrees, when an exposure amount in the photolithography process is increased, there is a case such that the angle α of the top pole tip 27a formed with the increased exposure amount is increased to 110 to 120 degrees.

In a position where the intermediate coupling portion 27a(2) and the connection portion 27a(3) are coupled to each other (hereinbelow, called "second coupling position"), the width W3 of the connection portion 27a(3) is wider than the width W2 of the intermediate coupling portion 27a(2). That is, a step in the width direction exists in the second coupling position. A step face 21c on the connection portion 27a(3) side in the step and the side face S2 of the intermediate coupling portion 27a(2) form an angle γ and a side face S3 of the connection portion 27a(3) and an extending direction of the step face 21c form an angle δ. In the embodiment, each of the angles γ and δ is equal to, for example, 90 degrees. Further, the side face S3 of the connection portion 27a(3) and an extending direction of an edge face (edge face on the rear side of the top pole tip 27a, which will be called hereinbelow "rear face") B1 on the rear side (side opposite to the air bearing surface 20) of the connection portion 27a(3) form an angle ϵ. In the embodiment, the angle ϵ is, for example, 90 degrees.

In the recess 60 of the top pole tip 27a, an inner face S4 of the recess 60 and the extending direction of the rear face B1 form an angle ξ, and the inner face S4 of the recess 60 and the edge face T1 form an angle η. In the embodiment, each of the angles ξ and η is, for example, 90 degrees.

In the top pole tip 27a shown in FIG. 12, the edge face T1 is in parallel with the front end face ST1 of the front end portion 27a(1) which faces a recording medium, the step faces 21a and 21c and the rear face B1. The front end face ST1 is a part of the air bearing surface 20. The edge face T1 is perpendicular to the side face S1 of the front end portion 27a(1), the side face S2 of the intermediate coupling portion 27a(2), the side face S3 of the connection portion 27a(3), and the inner face S4 of the recess 60. In the top pole tip 27a shown in FIG. 12, the position of the edge face T1 corresponds to, for example, the position of the step face 21c between the intermediate coupling portion 27a(2) and the connection portion 27a(3). The front end portion 27a(1) of the top pole tip 27a corresponds to an example of "track width defining portion" in the invention. The intermediate coupling portion 27a(2) corresponds to an example of "intermediate coupling portion" in the invention. Further, the connection portion 27a(3) corresponds to an example of "connection portion" in the invention.

Referring again to FIG. 11, the positional relation between the top pole 27c and the top pole tip 27a will be explained. In the embodiment, as obviously understood from FIG. 5A, the top pole tip 27a extends on the flat write gap layer 9 and, similarly, the top pole 27c extends on the flat insulating layer 30. The connection portion 27c(2) in the top pole 27c is connected to the connection portion 27a(3) (portion shown by broken lines in FIG. 5A) in the top pole tip 27a so as to overlap each other. In FIG. 5A and FIG. 11, the position of a front edge face 22 of the connection portion 27c(2) in the top pole 27c coincides with, for example, the position of the edge face T1. The edge face 22 is parallel to the air bearing surface 20. As shown in FIG. 11, it is preferable to set the length L6 of the connection portion 27c(2) in the top pole 27c, for example, to be equal to or longer than the length L3 of the connection portion 27a(3) in the top pole tip 27a (L6≧L3). It is preferable to set the width W8 of the connection portion 27c(2), for example, to be equal to or wider than the width W3 of the connection portion 27a(3) in the top pole tip 27a(W8≧W3).

For example, the following dimensions of the portions shown in FIGS. 11 and 12 are suitable. It is preferable to set the width W1 of the front end portion 27a(1), the width W2 of the intermediate coupling portion 27a(2) and the width W3 of the connection portion 27a(3) so as to satisfy the relation of W3>W2>W1 and to set so that the connection portions 27a(3)R and 27a(3)L have the same shape. The lengths of the portions are preferably set to satisfy L3>L1 and L3>L2.

width W1 of the front end portion 27a(1)=0.2 to 0.5 μm width W2 of the intermediate coupling portion 27a(2)= 1.2 to 3.5 μm width W4 (W5) of the right connection portion 27a(3)R (left connection portion 27a(3)L)=0.5 to 3.0 μm width W6 of the recess 60=0.5 to 2.0 μm width W7 of the yoke 27c(1)=15.0 to 40.0 μm width W8 of the connection portion 27c(2)=1.2 to 3.5 μm length L1 of the front end portion 27a(1)=0.3 to 0.8 μm length L2 of the intermediate coupling portion 27a(2)=0.3 to 3.0 μm length L3 (=L4) of the connection portion 27a(3)=1.0 to 4.0 μm Depth L5 of the recess 60=2.0 to 3.0 μm <<Action of Thin Film Magnetic Head>>

The action of the thin film magnetic head with the construction as described above will now be explained.

In a thin film magnetic head according to the embodiment, a magnetic flux generated by the thin film coil 29 in the information recording operation propagates the top pole 27c and flows almost uniformly into the connection portions 27a(3)R and 27a(3)L which construct the connection portion 27a(3) in the top pole tip 27a. The magnetic flux which flowed in the connection portions 27a(3)R and 27a(3)L of the connection portion 27a(3) flows into the intermediate coupling portion 27a(2) in the top pole tip 27a and is merged. Further, the magnetic flux is converged and flows in the front end portion 27a(1). The magnetic flux flowed in the front end portion 27a(1) reaches the tip of the front end portion 27a(1) and generates a signal magnetic field to the outside of the tip. By the signal magnetic field, information is recorded on a recording medium (not shown).

In order to assure the excellent overwrite characteristic of the thin film magnetic head, generally, it is necessary to smoothly and sufficiently supply the magnetic flux to the front end portion 27a(1) in the top pole tip 27a so that the signal magnetic field is sufficiently generated. In the following, the propagating state of the magnetic flux in the top pole which exerts an influence on the overwrite characteristic of the thin film magnetic head will be described in detail by comparing the structure of the thin film magnetic head (FIGS. 5A and 5B) according to the embodiment with that of the conventional thin film magnetic head (FIG. 32).

Figure 32:
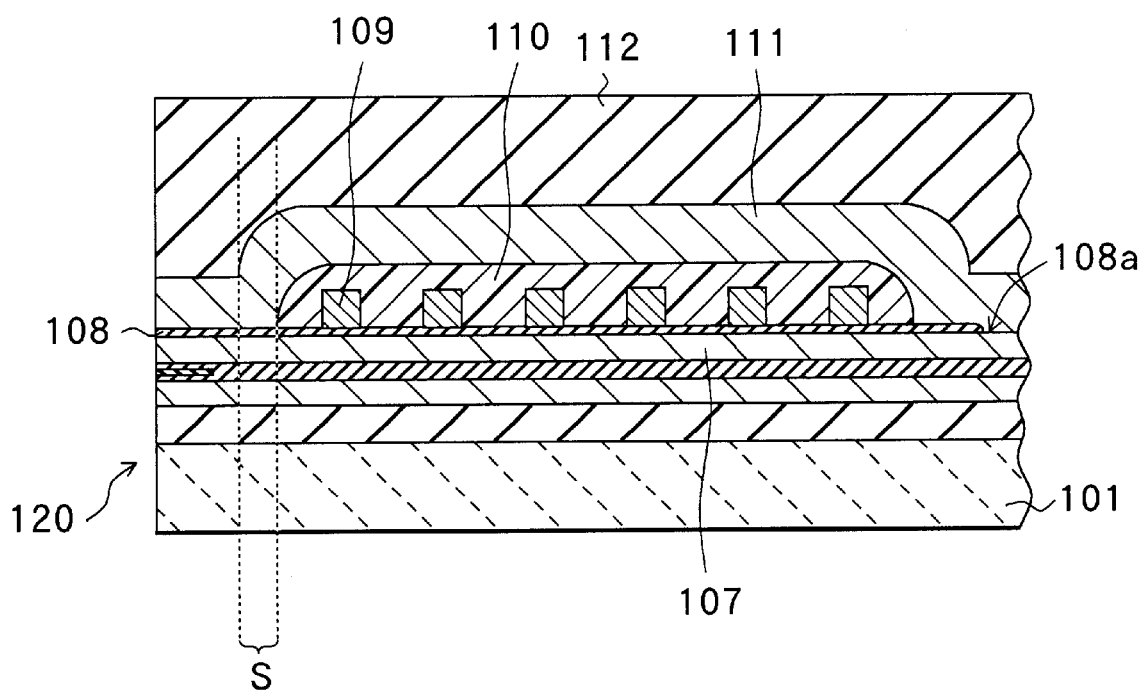
FIG. 32 is a cross section for explaining a process subsequent to FIG. 31.
Figure 33:
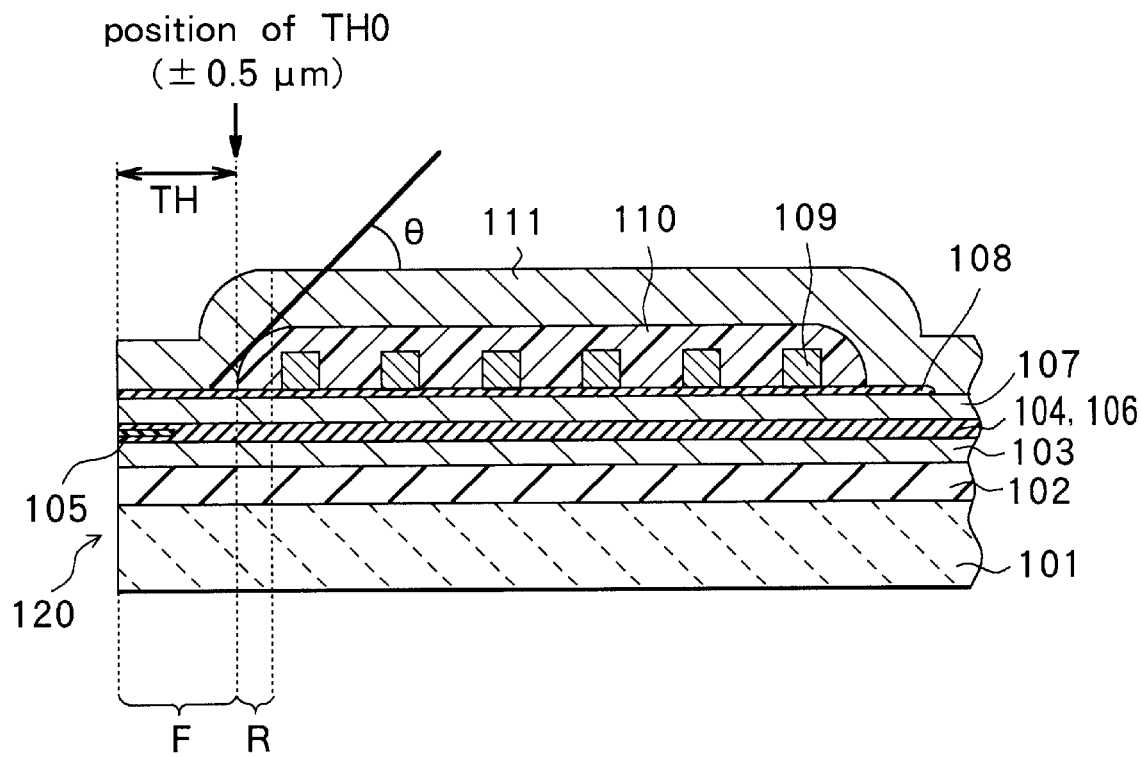
FIG. 33 is a cross section showing the structure of the conventional thin film magnetic head.
Figure 34:
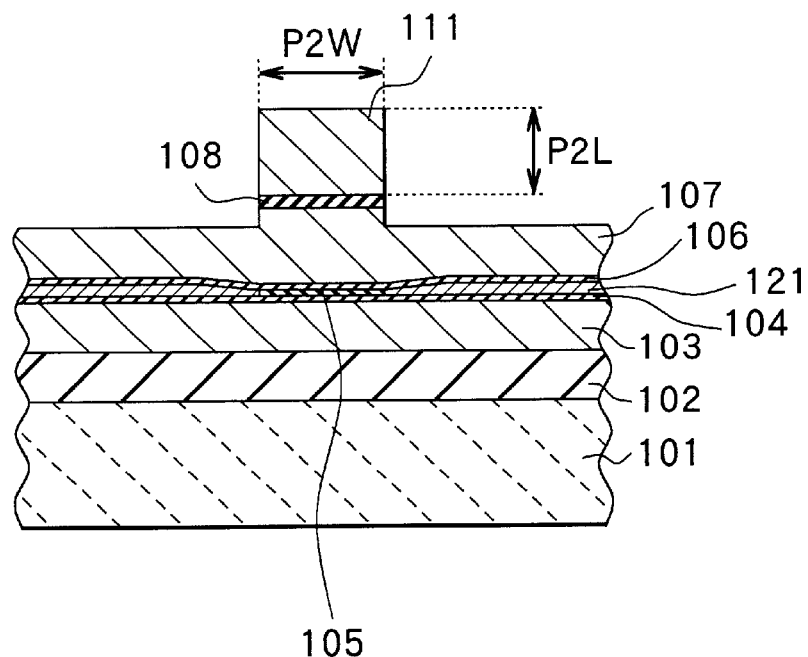
FIG. 34 is a cross section parallel to the air bearing surface in the conventional thin film magnetic head.
Figure 35:
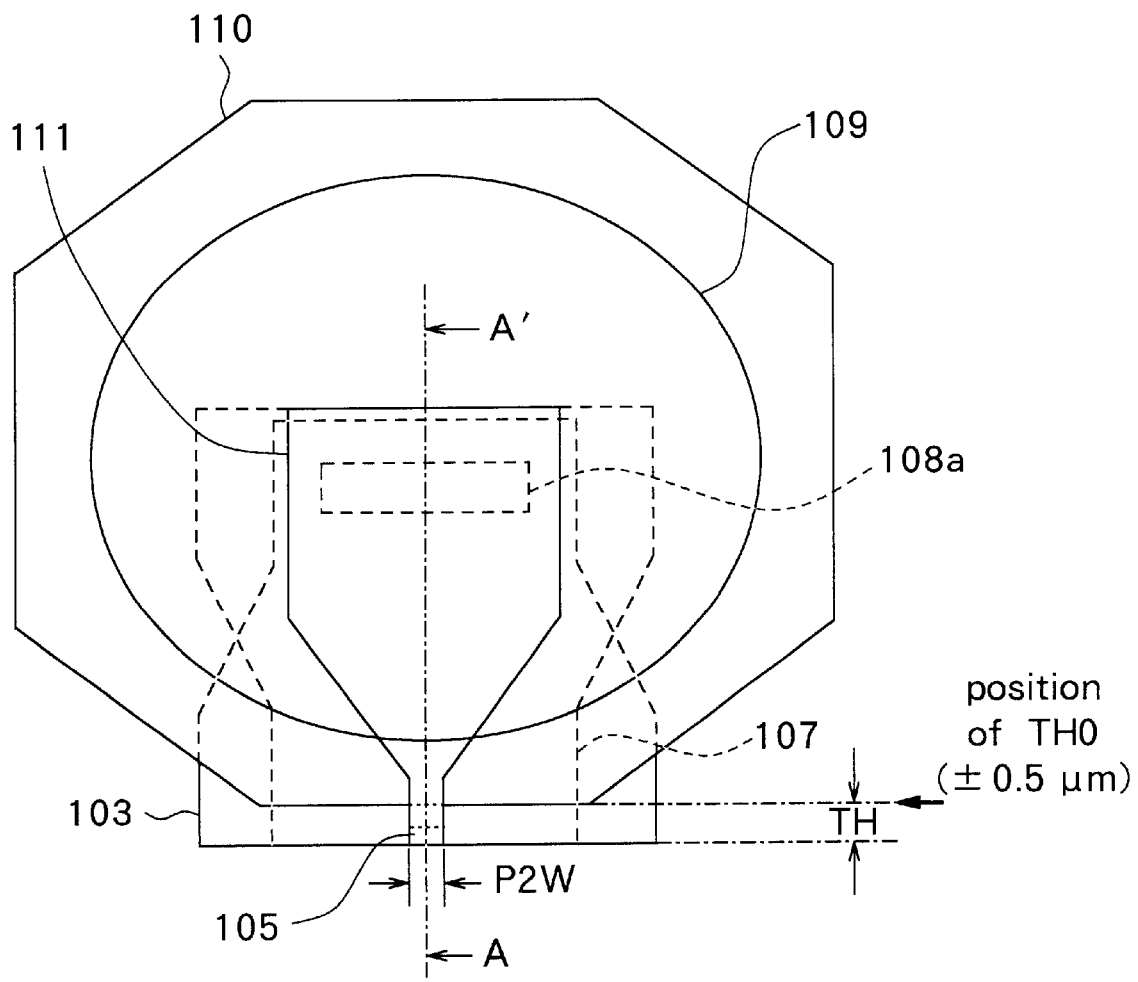
FIG. 35 is a plan view showing the structure of the conventional thin film magnetic head.
Figure 36:
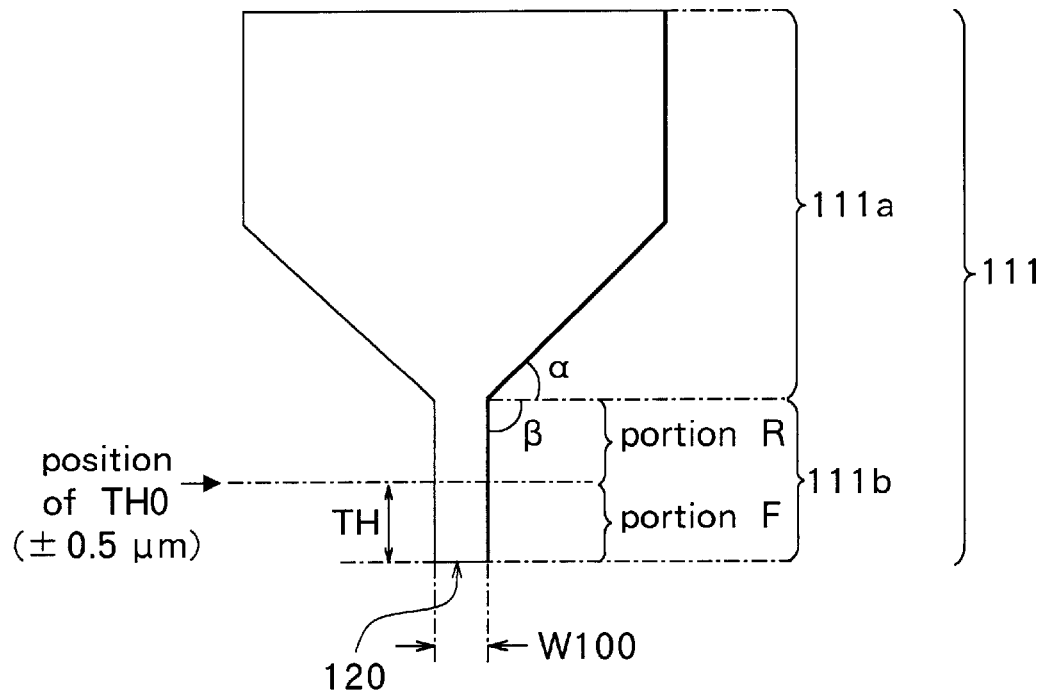
FIG. 36 is a plan view showing the structure of the top pole in the conventional thin film magnetic head.
Figure 37:
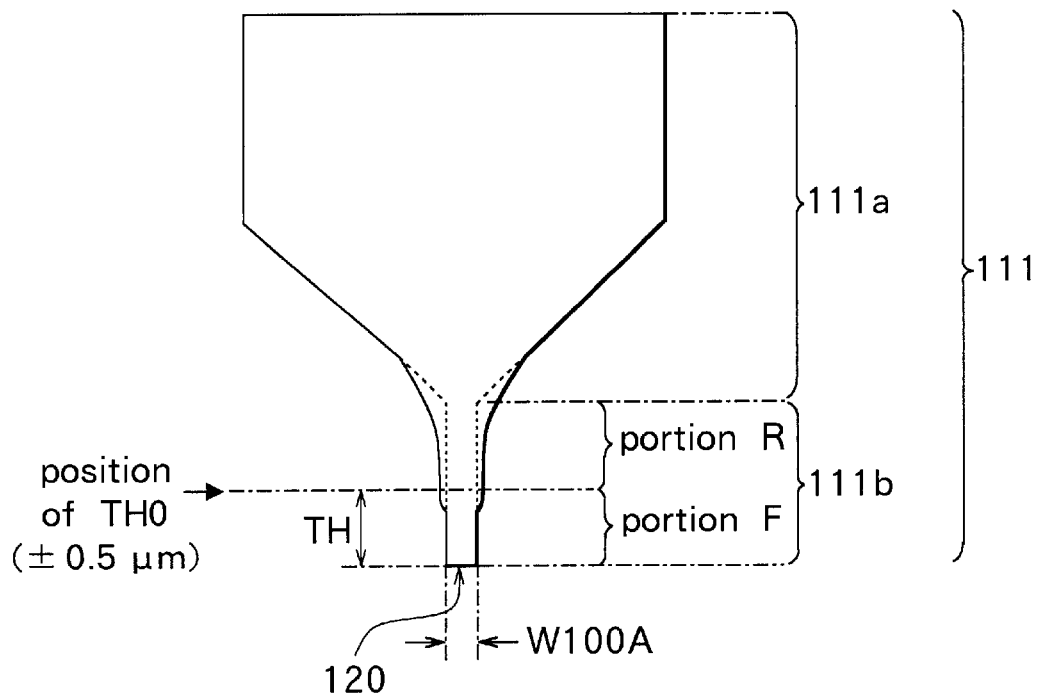
FIG. 37 is a plan view of the top pole for explaining problems which occur when the top pole in the conventional thin film magnetic head is made finer.

In the conventional thin film magnetic head shown in FIG. 32, the magnetic flux generated by the thin film coil 109 propagates through the top pole 111 toward the air bearing surface 120 side and finally arrives at the tip of the top pole 111. At this time, as shown in FIG. 32, the magnetic flux flows downward in the drawing in the region S which extends in the thickness direction between the region formed on the flat write gap layer 108 in the top pole 111 and the region formed on the apex. In the conventional thin film magnetic head shown in FIG. 32, only the thin write gap layer 108 is disposed between the thin film coil 109 and the bottom pole 107. In the region S in the top pole 111, therefore, a part of the magnetic flux flowing downward passes through the write gap layer 108. In this case, the magnetic flux which has passed through the write gap layer 108 propagates to the bottom pole 107. In the following, the propagation of the magnetic flux from the top pole to the bottom pole via the write gap layer will be called "leak of magnetic flux".

The leak of the magnetic flux induces the following inconveniences.

First, by the leak of the magnetic flux from the top pole 111 to the bottom pole 107, the absolute amount of the magnetic flux reaching from the top pole 111 to the tip of the top pole 111 decreases. Due to the decrease in the amount of the magnetic flux reaching the tip of the top pole 111, the magnetic flux generated by the thin film coil 109 cannot be sufficiently supplied to the tip of the top pole 111. Consequently, the overwrite characteristic of the thin film magnetic head having such a structure considerably deteriorates.

Second, local concentration of the magnetic flux onto the bottom pole 107 due to the leak of the magnetic flux exerts an adverse influence on the reading operation of the thin film magnetic head. For example, due to excessive concentration of the magnetic flux on the bottom pole 107, when a part of the magnetic flux passes through the bottom pole 107 and reaches the MR film 105, the magnetic flux which has reached the MR film 105 acts as magnetic noise at the time of reading. It disturbs the normal reading operation of the thin film magnetic head.

In contrast, in the thin film magnetic head according to the embodiment shown in FIGS. 5A and 5B, the magnetic shield layer 81 adjacent to the write gap layer 9 is disposed in a part of the bottom pole 7 in a region corresponding to the region S in the conventional thin film magnetic head shown in FIG. 32, that is, a region (hereinbelow, also simply called an "overlapped region") corresponding to a contact face (hereinbelow, also simply called a "magnetic coupling face") 27x in which the top pole 27c and the connection portion 27a(3) of the top pole tip 27a overlap with each other and are in contact with each other. The magnetic shield layer 81 suppresses propagation of the magnetic flux flowing downward through the write gap layer 9 to the bottom pole 7 in the overlap region corresponding to the magnetic coupling face 27x. Consequently, a magnetic flux leak phenomenon in the overlap region corresponding to the magnetic coupling face 27x can be prevented and the propagation loss which occurs when the magnetic flux propagates from the connection portion 27a(3) in the top pole tip 27a to the front end portion 27a(1) can be suppressed. That is, the magnetic flux generated by the thin film coil 29 can be smoothly supplied to the front end portion 27a(1) in the top pole tip 27a without a large loss, so that a sufficient magnetic flux reaches the tip of the front end portion 27a(1). Because of the existence of the magnetic shield layer 81, the propagation of the magnetic flux to the portions other than the recording head portion, for example, the propagation of magnetic flux to the MR film 5 in the reproducing head portion can be prevented. The magnetic shield layer 81 can suppress the propagation of the magnetic flux from the connection portion 27a(3) in the top pole tip 27a to the bottom pole 7 and also the propagation of the magnetic flux from the bottom pole 7 to the connection portion 27a(3).

As described in FIG. 10, in the thin film magnetic head of the embodiment, the edge face T1 of the top pole tip 27a defines the TH0 position as the reference of the throat height TH. That is, the TH0 position is determined simultaneously with the formation of the top pole tip 27a. Moreover, since the top pole tip 27a is formed on a flat face (top face of the write gap layer 9), as compared with the case where the top pole tip 27a is formed on an inclined face, the edge face T1 can be more accurately positioned.

An allowable volume of the magnetic flux (hereinbelow, called "magnetic volume") of each of the front end portion 27a(1), the intermediate coupling portion 27a(2) and the connection portion 27a(3) exerts a large influence on the propagating state of the magnetic flux flowing through the portions of the top pole tip 27a. When it is assumed that magnetic volumes of the front end portion 27a(1), the intermediate coupling portion 27a(2) and the connection portion 27a(3) are V1, V2 and V3, respectively, and the portions are constructed so as to satisfy the relation of, for example, V3>V2>V1, the magnetic flux generated by the thin film coil 29 is converged step by step as it passes through the connection portion 27a(3), the intermediate coupling portion 27a(2) and the front end portion 27a(1). In this case, the top pole tip 27a and the top pole 27c are overlapped in the two connection portions 27a(3)R and 27a(3)L which are separated from each other in the width direction, and are magnetically coupled to each other with a sufficient contact area in the overlapped regions. Consequently, the concentration of the magnetic flux in the region can be avoided and the occurrence of a magnetic flux saturation phenomenon when a magnetic flux flows from a region of a large magnetic volume to a region of a small magnetic volume can be prevented. That is, the propagation loss of the magnetic flux caused by the magnetic flux saturating phenomenon can be reduced and a magnetic flux of a sufficient volume can be smoothly supplied to the front end portion 27a(1) in the top pole tip 27a.

Figure 13:
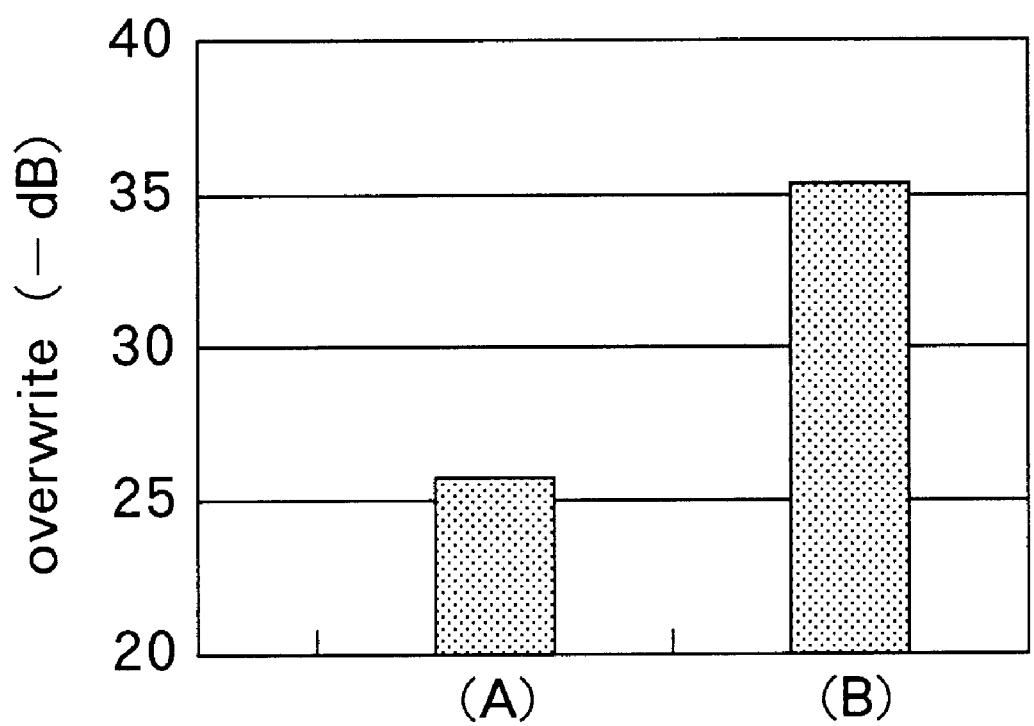
FIG. 13 is a diagram showing overwrite characteristics of the thin film magnetic head in FIG. 10 and a conventional thin film magnetic head.

FIG. 13 shows the overwrite characteristic of the conventional thin film magnetic head and that of the thin film magnetic head of the embodiment so as to compare with each other. (A) in the drawing shows the overwrite characteristic of the conventional thin film magnetic head having the structure as shown in FIG. 32. (B) shows the overwrite characteristic of the thin film magnetic head according to the embodiment having the structure as shown in FIGS. 5A and 5B. As shown in the drawing, the thin film magnetic head of the embodiment obtains a high value of 35.5 dB in contrast to a value 26.0 dB of the conventional thin film magnetic head. It means that the overwrite characteristic is improved.

Further, the thin film magnetic head including the top pole tip 27a having the shape as shown in FIG. 12 has the following advantages also with respect to the accuracy in manufacturing.

Figure 15:
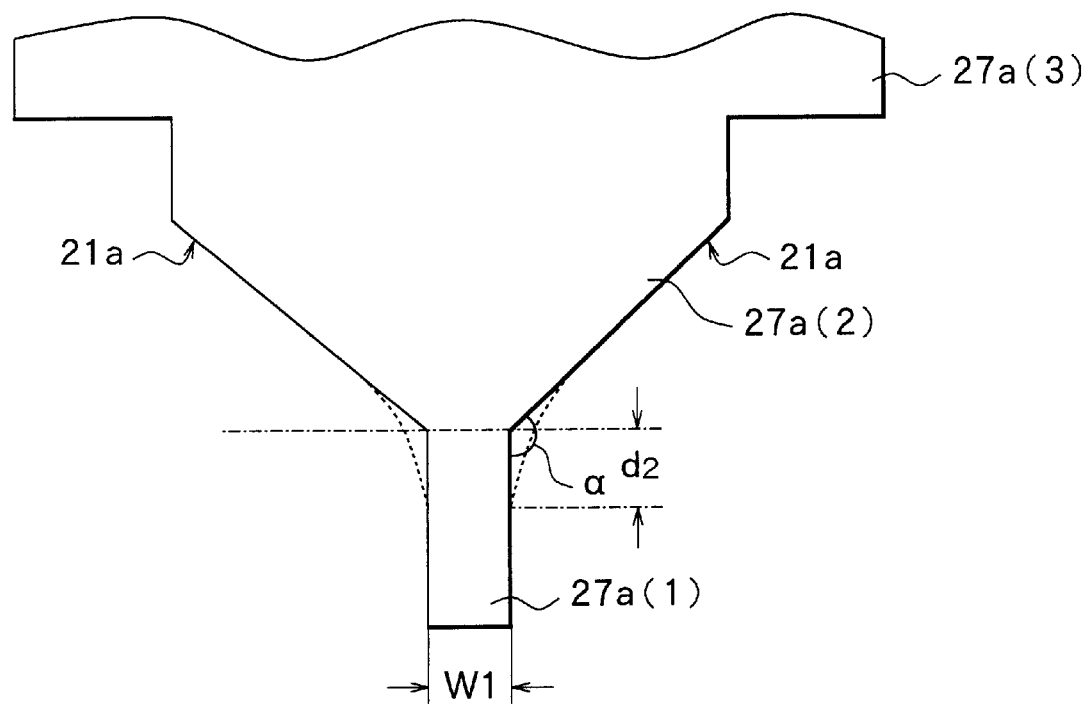
FIG. 15 is an enlarged plan view of a top pole for explaining the action in a comparative example to the thin film magnetic head shown in FIG. 10.

Specifically, when the angle α formed by the step face 21a in the first coupling position and the side face of the front end portion 27a(1) is much larger than 90 degrees (for example, 130 degrees or more) as shown in FIG. 15 as a comparative example, in the case of selectively exposing and patterning the photoresist by using a mask in the photolithography process, the region in which the pattern width increases in the photoresist region becomes very large. To be specific, in the front end portion 27a(1), the length d2 of a portion (shown by broken lines in the drawing) which becomes wider than an expected target width W1 becomes considerably long. As a result, the length having the constant target width W1 becomes short.

Figure 14:
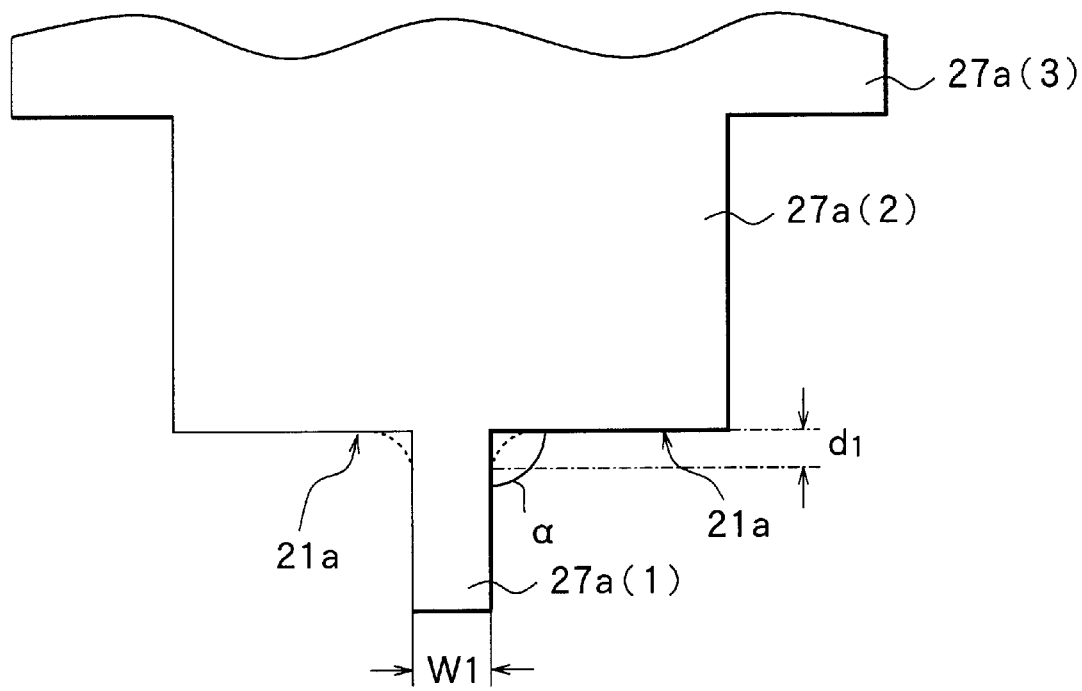
FIG. 14 is an enlarged plan view of the top pole tip for explaining the action in the thin film magnetic head shown in FIG. 10.

On the contrary, in the top pole tip 27a in the thin film magnetic head of the embodiment, as shown in FIG. 14, the angle α formed by the step face 21a in the first coupling position and the side face S1 of the front end portion 27a(1) is almost 90 degrees. Consequently, when the photoresist is selectively exposed and patterned by using a mask in the photolithography process, an increase in the pattern width of the photoresist region can be effectively suppressed. Specifically, as shown in FIG. 14, the length d1 of a portion (shown by broken lines) in which the front end portion 27a(1) is formed wider than the expected target width W1 can be extremely reduced.

As described above, according to the thin film magnetic head of the embodiment, since the magnetic shield layer 81 adjacent to the write gap layer 9 is disposed in a part of the bottom pole 7 in the overlap region corresponding to the magnetic coupling face 27x between the top pole 27c and the connection portion 27a(3) in the top pole tip 27a, the leak of the magnetic flux during the propagation of the magnetic flux generated by the thin film coil 29 from the top pole 27c to the front end portion 27a(1) in the top pole tip 27a can be suppressed. Since the sufficient amount of magnetic flux can be supplied to the front end portion 27a(1) in the top pole tip 27a, the excellent overwrite characteristic can be assured.

In the embodiment, since the TH0 position is defined by the edge face T1 of the top pole tip 27a formed on the flat face, the TH0 position can be accurately defined upon formation of the top pole tip 27a and the throat height TH which contributes to the recording characteristic of the thin film magnetic head can be achieved with high accuracy.

Since the top pole tip 27a and the top pole 27c are magnetically coupled to each other with a sufficient contact area in the two connection portions 27a(3)R and 27a(3)L which are separated from each other in the width direction, the magnetic flux propagation loss caused by the magnetic flux saturation which occurs when the magnetic flux flows from the region of a large magnetic volume to the region of a small magnetic volume can be reduced and the magnetic flux of a sufficient volume can reach the front end portion 27a(1) in the top pole tip 27a. Even in the case where the width W1 of the front end portion 27a(1) is narrowed to, for example, the order of submicrons, an excellent overwrite characteristic can be therefore assured.

In the embodiment, in the first coupling position of the top pole tip 27a, a step in the width direction which changes to have a substantially right angle is provided between the front end portion 27a(1) and the intermediate coupling portion 27a(2). Thus, the increase in the pattern width of the photoresist used for forming the front end portion 27a(1) can be prevented and the region in which the width of the front end portion 27a(1) defining the write track width on a recording medium is almost the target value W1 can be sufficiently assured. As a result, the write track width on a recording medium can be narrowed.

Since the top pole 27c is formed on the flat portion subjected to the CMP in the embodiment, the photoresist pattern can be formed by the photolithography with high accuracy. As a result, the top pole 27c can be also formed with high accuracy.

Since the thick insulating film 28 made of alumina or the like is formed between the write gap layer 9 and the thin film coil 29 in the embodiment, the dielectric withstand voltage between the thin film coil 29 and the bottom pole 7 can be increased and leakage of the magnetic flux from the thin film coil 29 can be reduced.

Although the top pole 27c is made of, for example, NiFe or iron nitride (FeN) in the embodiment, a material having a high saturation magnetic flux density such as an amorphous Fe—Co—Zr material may be used. Two or more kinds of such materials may be also used in a layered structure. The bottom pole 7 may be also made of a magnetic material obtained by stacking NiFe and the material having a high saturated magnetic flux density.

<<Modifications of First Embodiment>>

Some modifications of the embodiment will now be described.

Figure 16:
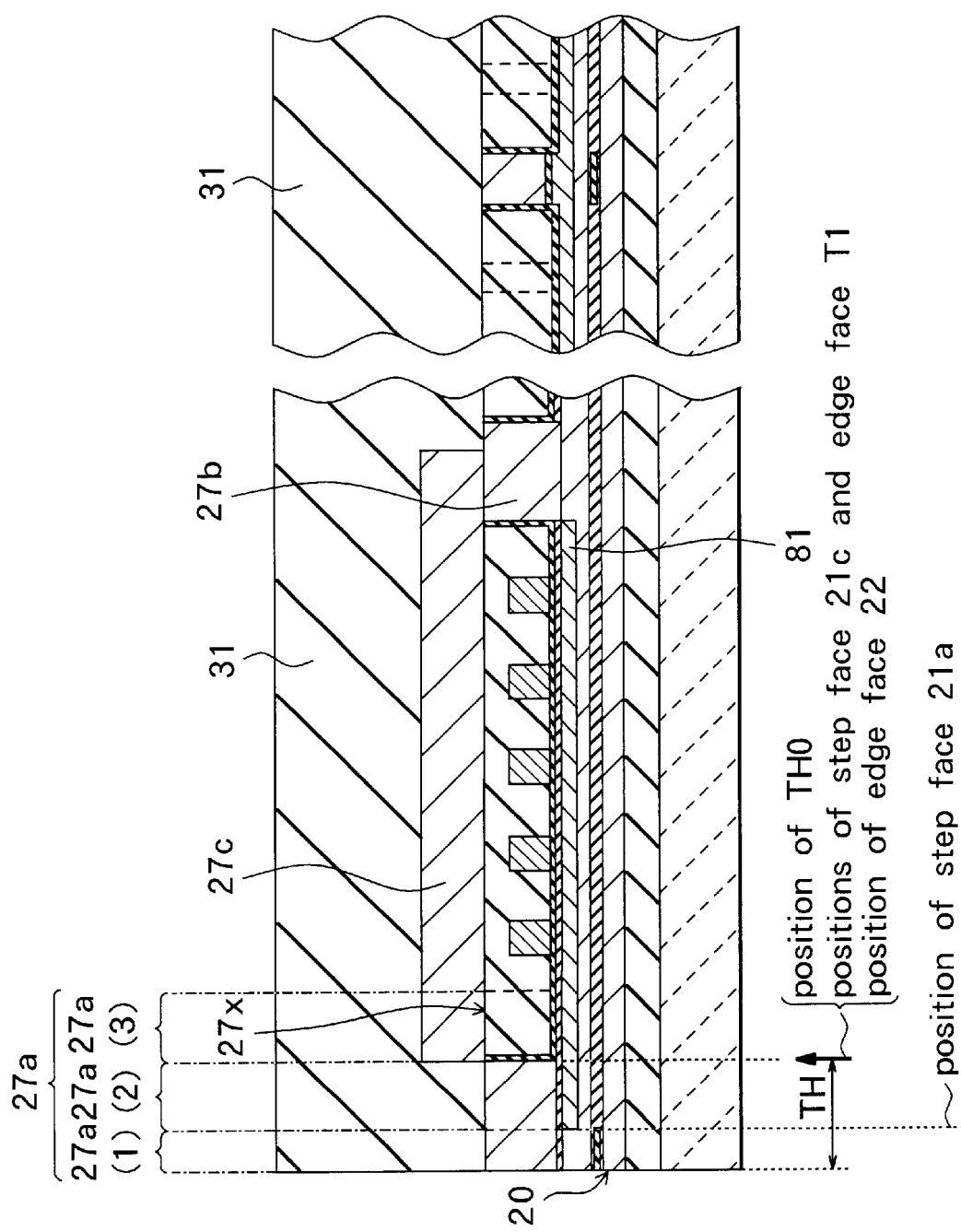
FIGS. 16A and 16B are cross sections showing a modification of the thin film magnetic head illustrated in FIG. 5.

In the embodiment, the case where the shape in plane of the magnetic shield layer 81 is similar to, for example, that of the connection portion 27a(3) in the top pole tip 27a constructing the magnetic coupling face 27x has been described. However, the invention is not limited to the case. FIGS. 16A and 16B are cross sections showing a modification of the magnetic shield layer 81 and corresponds to FIGS. 5A and 5B in the embodiment. As shown in FIGS. 16A and 16B, as long as the magnetic shield layer 81 includes the shape in plane of the connection portion 27a(3) constructing the magnetic coupling face 27x, the disposing range of the magnetic shield layer 81 can be freely expanded in both the length and width directions. The expanding range in the length direction of the magnetic shield layer 81 in this case is as described hereinbelow. As shown in FIG. 16A, the magnetic shield layer 81 is extended forward, for example, until the position of the front edge coincides with that of the step face 21a of the intermediate coupling portion 27a(2) in the top pole tip 27a. On the other hand, it is preferable that the magnetic shield layer 81 extends rearward until the position of the rear edge coincides with that of the front edge of the magnetic path forming pattern 27b. For example, as shown in FIG. 16B, the width of the magnetic shield layer 81 can be freely adjusted so as to be wider than that of the connection portion 27a(3). In the case of disposing the magnetic shield layer 81 as well, effects similar to those in the case shown in FIGS. 5A and 5B are obtained. Particularly, by forming the magnetic shield layer 81 in the region corresponding to the disposing region of the thin film coil 29, the direct propagation of the magnetic flux from the thin film coil 29 to the bottom pole 7 can be more certainly suppressed.

In the embodiment, the magnetic shield layer 81 can be adjusted to be thicker or thinner. In this case, the thickness of the magnetic shield layer 81 is set to be equal to or less than that of the bottom pole 7. In the case of increasing the thickness of the magnetic shield layer 81, the magnetic volume of the bottom pole 7 is partially decreased. Consequently, it is preferable that the thickness of the magnetic shield layer 81 is set to a degree such that the magnetic volume of the bottom pole 7 does not become too small.

Figure 17:
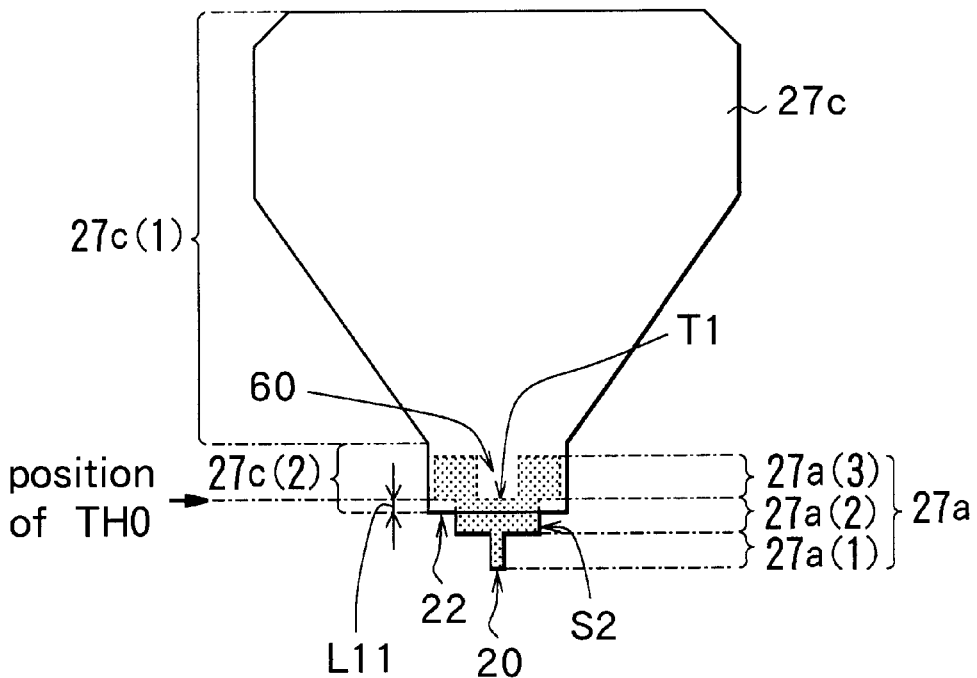
FIG. 17 is a plan view showing a modification of the top pole and the top pole tip illustrated in FIG. 11.
Figure 18:
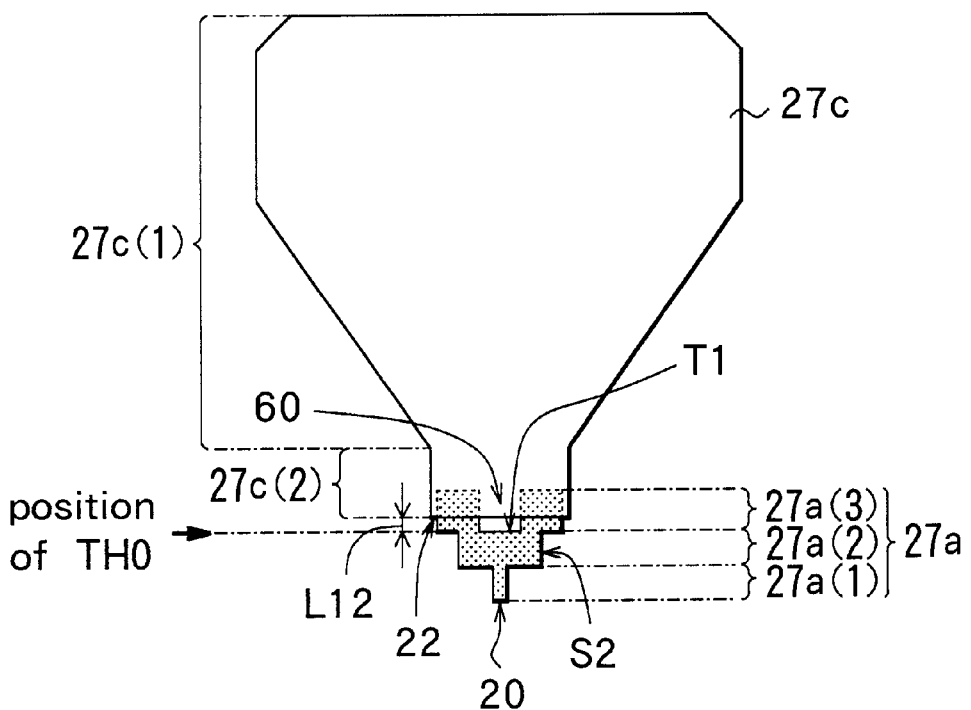
FIG. 18 is a plan view showing another modification of the top pole and the top pole tip illustrated in FIG. 11.

Although the case (FIG. 11) where the position of the edge face 22 of the connection portion 27c(2) in the top pole 27c coincides with the position of the edge face T1 which determines the TH0 position has been described in the foregoing embodiment, the invention is not limited to the case. For example, as shown in FIG. 17, the connection portion 27c(2) in the top pole 27c may extend so that the position of the edge face 22 on the front side exceeds the position of the edge face T1 and overlaps with a part of the intermediate coupling portion 27a(2). In this case, it is suitable that a deviation length L11 from the edge face 22 of the connection portion 27c(2) in the top pole 27c to the position of the edge face T1 is set, for example, within a range from 0.5 to 1.5 μm. As shown in FIG. 18, the position of the edge face 22 in the connection portion 27c(2) in the top pole 27c may be deviated rearward (the side opposite to the air bearing surface) of the position of the edge face T1. A deviation length L12 in this case is set, preferably, in a range from 0.5 to 1.5 μm. In the cases shown in FIGS. 17 and 18 as well, as long as the magnetic shield layer 81 has the shape in plane corresponding to the magnetic coupling face of the top pole 27c and the top pole tip 27a, the range of disposing the magnetic shield layer 81 can be expanded. In this case as well, effects similar to those of the case shown in FIGS. 5A and 5B can be obtained.

In the foregoing embodiment, for example, as shown in FIGS. 2A and 2B, as a procedure of forming the recess 80 in which the magnetic shield layer 81 is buried, first, the bottom pole 7 is formed by plating or the like, a part of the bottom pole 7 is selectively etched to a predetermined depth, and thereby the recess 80 is formed. The invention is not limited to the case. For example, as will be described hereinbelow, by forming the bottom pole separately so as to be constructed from two or more layers by repeating processes, a recess having a characteristic in shape similar to that in the case shown in FIGS. 2A and 2B may be formed as a result. In the following, for example, the case where the bottom pole is made from two layers will be described by referring to FIGS. 19A and 19B.

FIGS. 19A and 19B show a part of a process of manufacturing a thin film magnetic head in the case of forming a recess to be filled with the magnetic shield layer 81 by a forming method other than that shown in FIGS. 2A and 2B in the foregoing embodiment, corresponding to the manufacturing process shown in FIGS. 2A and 2B. In FIGS. 19A and 19B, the same elements as those of FIGS. 2A and 2B in the foregoing embodiment are designated by the same reference numerals. Since the processes until the shield gap film 6 is formed in FIGS. 19A and 19B are similar to those shown in FIGS. 2A and 2B in the foregoing embodiment, the description is omitted here. In the method of manufacturing the thin film magnetic head shown in FIGS. 19A and 19B, after forming the shield gap film 6, a first bottom pole 71 made of Permalloy or the like is formed on the shield gap film 6 by, for example, plating. Then a photoresist film (not shown) having a predetermined shape in plane is disposed in a predetermined position on the first bottom pole 71. By performing processes similar to those for the first bottom pole 71 by using the photoresist film as a mask, a second bottom pole 72 is selectively formed on the first bottom pole 71. The "predetermined position" and the "predetermined shape in plane" are similar to those in the case described in the foregoing embodiment. After forming the second bottom pole 72, the photoresist film is removed, and thereby an opening 180 is formed, which has characteristics of the shape similar to those of the recess 80 shown in FIGS. 2A and 2B in the embodiment in the region in which the photoresist film is formed. Although the case where the bottom pole is made from two layers (first and second bottom poles 71 and 72) has been described by referring to FIGS. 19A and 19B, the invention is not limited to the case. For example, the bottom pole may be made from three or more layers. The forming method of the recess 80 and that of the opening 180 described by referring to FIGS. 2A and 2B and FIGS. 19A and 19B can be properly selected.

In the case of forming the bottom pole by using the manufacturing method as shown FIGS. 19A and 19B, for example, as shown in FIGS. 20A and 20B, an insulating layer 91 made of alumina or the like may be disposed between the first and second bottom poles 71 and 72. In the thin film magnetic head having such a structure, because of the existence of the insulating layer 91, propagation of the magnetic flux from the second bottom pole 72 to the first bottom pole 71 can be suppressed.

When a thin film magnetic head is constructed by selectively using the top pole 27c and the top pole tip 27a from the above-described various ones, it is preferable to select the top pole 27c and the top pole tip 27a in consideration of the following points.

First, it is important to set the throat height to a proper length. For example, in FIG. 11, the shorter the throat height TH is, the more it is generally preferable because as the throat height TH becomes shorter, the volume of the magnetic flux reaching the front end face ST1 of the front end portion 27a(1) increases and the overwrite characteristic at the time of recording is improved. On the other hand, when the throat height TH is shortened, there is the possibility that a side write phenomenon at the time of recording is induced. When the throat height TH is shortened too much, the step face 21a (width W3) of the connection portion 27a(3) in the top pole tip 27a and the edge face 22 (width W8) on the front side of the connection portion 27c(2) in the top pole 27c are positioned too close to the air bearing surface 20. Consequently, it is feared that an excessive magnetic flux which cannot be converged to the width W1 of the front end portion 27a(1) is supplied to the front end portion 27a(1) or a magnetic flux is directly emitted from the step face 21a of the connection portion 27a(3) and the edge face 22 of the connection portion 27c(2) to the air bearing surface 20 side. In the case of setting the throat height TH, therefore, it is preferable to determine the shape and dimensions of each of the pole portions so as not to induce the side write phenomenon.

Second, for example, in FIG. 11, it is preferable that a proper magnetic volume of each of the intermediate coupling portion 27a(2) and the connection portion 27a(3) positioning on the rear side of the front end portion 27a(1) of the top pole tip 27a is set proper. In this case, "a magnetic volume of each of the intermediate coupling portion 27a(2) and the connection portion 27a(3) being set proper" denotes that the intermediate coupling portion 27a(2) and the connection portion 27a(3) have the sufficient capacity of a magnetic flux so as to propagate a proper volume of the magnetic flux to the front end portion 27a(1). For example, when the magnetic volume of the intermediate coupling portion 27a(2) and the connection portion 27a(3) is too small, the volume of the magnetic flux passed to the front end portion 27a(1) becomes short and the overwrite characteristic at the time of recording deteriorates. The intermediate coupling portion 27a(2) and the connection portion 27a(3) have to therefore have a large area so as to assure a sufficient magnetic volume. On the other hand, when the magnetic volume of the intermediate coupling portion 27a (2) and the connection portion 27a(3) is larger than necessary, an excessive magnetic flux is passed into the front end portion 27a(1), so that there is the possibility that the side write phenomenon at the time of recording is induced.

It is therefore preferable to determine the shapes and dimensions of the intermediate coupling portion 27a(2) and the connection portion 27a(3) so that the sufficient and proper volume of the magnetic flux can be supplied to the front end portion 27a(1) of the top pole tip 27a while converging the magnetic flux flowing from the top pole 27c step by step.

Second Embodiment

A second embodiment of the invention will now be described.

The case of forming the magnetic shield layer 81 in a part of the bottom pole 7 in the overlap region corresponding to the magnetic coupling face 27x of the top pole 27c and the top pole tip 27a, for example, as shown in FIGS. 5A and 5B has been described in the first embodiment. In contrast to the above, in the second embodiment, a case of forming a magnetic shield layer for suppressing a leak of the magnetic flux in a part of the connection portion 27a(3) of the top pole tip 27a in the overlap region corresponding to the magnetic coupling face 27x will be described.

Referring to FIGS. 21A and 21B to FIG. 24, a method of manufacturing the thin film magnetic head according to the second embodiment of the invention will be described.

Figures 21A, 21B:
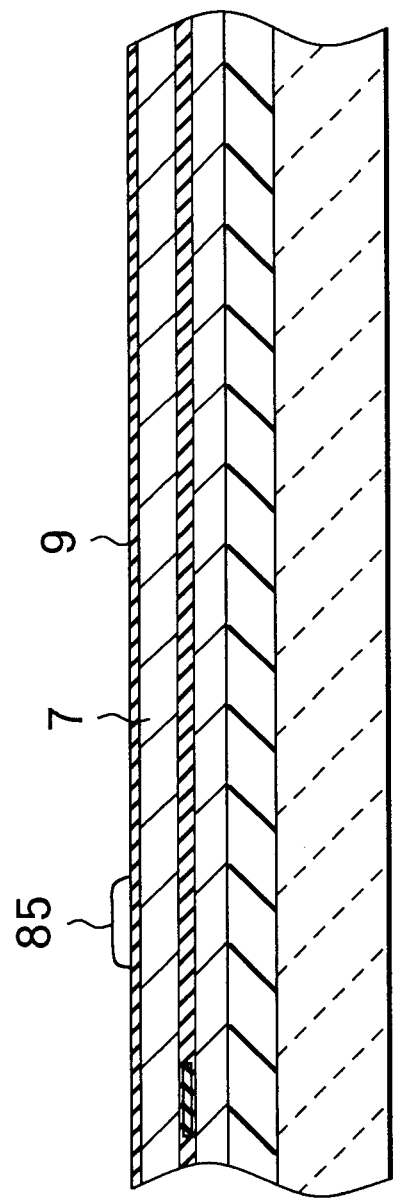
FIGS. 21A and 21B are cross sections for explaining a process in the method of manufacturing a thin film magnetic head according to the second embodiment of the invention.
Figure 23:
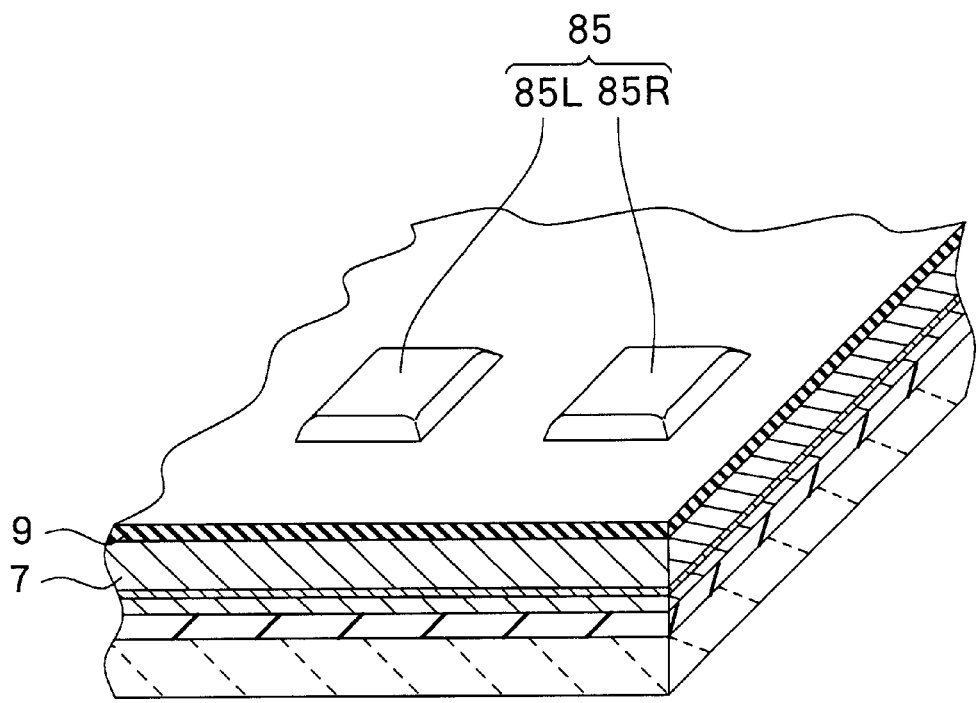
FIG. 23 is a perspective view corresponding to the cross sections of FIGS. 21A and 21B.
Figure 24:
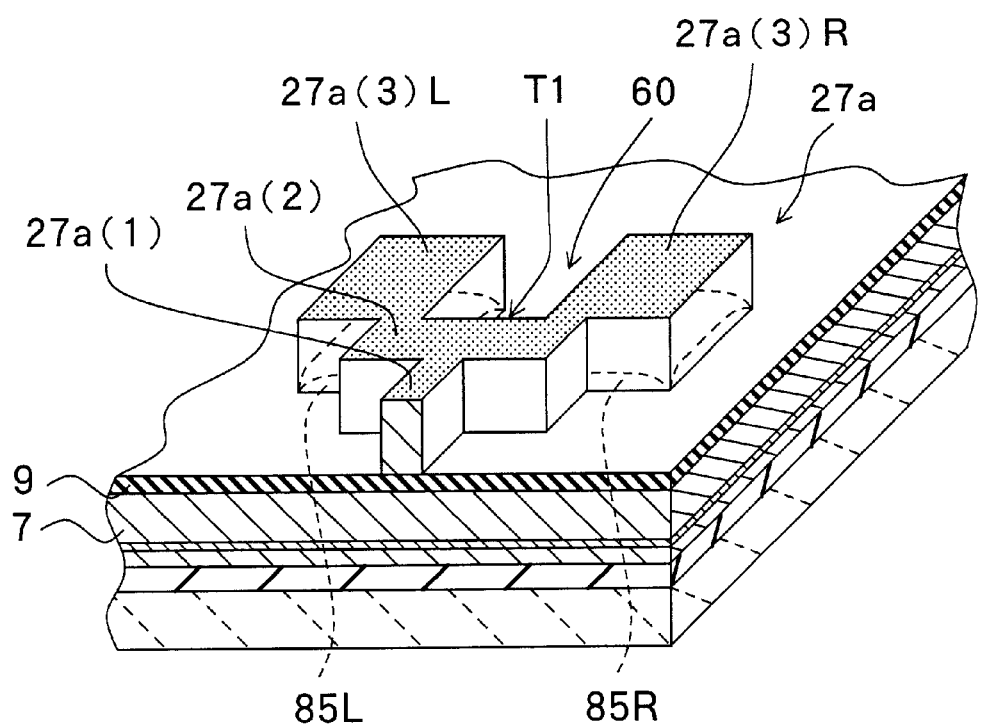
FIG. 24 is a perspective view corresponding to the cross sections of FIGS. 22A and 22B.

FIGS. 21A and 21B and FIGS. 22A and 22B show main processes in a manufacturing method of the embodiment. FIGS. 21A and 22A are cross sections perpendicular to the air bearing surface. FIGS. 21B and 22B are cross sections parallel to the air bearing surface of the pole portion. Each of FIGS. 23 and 24 is perspective view in the manufacturing processes in the embodiment. FIG. 23 corresponds to FIG. 21A and 21B. FIG. 24 corresponds to FIG. 22A and 22B. In those drawings, the same components as those in the first embodiment are designated by the same reference numerals.

In the method of manufacturing the thin film magnetic head according to the embodiment, since the processes until formation of the bottom pole 7 shown in FIGS. 21A and 21B are the same as those in FIGS. 1A and 1B in the first embodiment, the description is omitted here.

In the embodiment, when the formation of the bottom pole 7 is finished as shown in FIGS. 1A and 1B, as shown in FIGS. 21A and 21B and FIG. 23, the write gap layer 9 made of alumina or the like is formed on the whole surface in thickness of about 0.15 to 0.3 $\mu$m.

Subsequently, in a predetermined position on the write gap layer 9, for example, a photoresist is patterned in a predetermined shape in plane by a high-precision photolithography process. Then the photoresist is subjected to, for example, a heat treatment at a temperature of about 250° C., and thereby a magnetic shield layer 85 is formed. The "predetermined position" and the "predetermined shape in plane" are similar to those in the first embodiment. As shown in FIGS. 21B and 23, the magnetic shield layer 85 is comprised of two projected regions on the write gap layer 9, that is, a right magnetic shield layer 85R and a left magnetic shield layer 85L. The height (thickness) from the write gap layer 9 of the magnetic shield layer 85 is set to, for example, about 0.5 to 1.5 $\mu$m.

As shown in FIGS. 22A and 22B, on the rear side of the region in which the thin film coil will be formed in a following process, the write gap layer 9 is partially etched to form the opening 9b to create a magnetic path. As shown in FIGS. 22A and 22B and FIG. 24, in a position forward of the region in which the thin film coil 29 will be formed in a following process, the top pole tip 27a is selectively formed on the write gap layer 9 by, for example, electroplating. As the top pole tip 27a, for example, that shown in FIG. 11 in the first embodiment can be used. Upon formation of the top pole tip 27a, the forming position of the connection portion 27a(3) is determined so as to coincide with that of the magnetic shield layer 85. That is, the right connection portion 27a(3)R in the top pole tip 27a is formed on the right magnetic shield layer 85R and the left connection portion 27a(3)L is formed on the left magnetic shield layer 85L. Upon formation of the top pole tip 27a, the magnetic path forming pattern 27b is formed in the opening 9b. Since the materials and forming methods of the top pole tip 27a and the magnetic path forming pattern 27b and further the subsequent manufacturing method are similar to those in the first embodiment, the description is omitted here.

In the thin film magnetic head having such a structure as well, in a manner similar to the first embodiment, a leak of the magnetic flux in the overlap region corresponding to the magnetic coupling face 27x can be suppressed by the existence of the magnetic shield layer 85. While avoiding the propagation loss of the magnetic flux, the sufficient magnetic flux can be supplied to the front end portion 27a(1) of the top pole tip 27a, so that the excellent overwrite characteristic can be assured.

In the embodiment, in the case of increasing the thickness of the magnetic shield layer 85, the magnetic volume of the connection portion 27a(3) in the top pole tip 27a decreases. Consequently, it is preferable to set the thickness of the magnetic shield layer 85 to a degree such that the magnetic volume of the connection portion 27a(3) does not become too small. The actions, effects, modifications and the like regarding the construction except for the above of the thin film magnetic head in the embodiment are similar to those of the first embodiment. For example, as shown in FIG. 16A, they are similar also in the case where the disposing range of the magnetic shield layer 85 extends to the portion corresponding to the intermediate coupling portion 27a(2) in the top pole tip 27a. In the case of adjusting the thickness and the disposing range of the magnetic shield layer 85, therefore, it is desirable to perform the adjustment in a range where the propagation of the magnetic flux in the top pole tip 27a is not disturbed while sufficiently assuring the magnetic volume in each of the portions of the top pole tip 27a.

In the embodiment, it is also possible to dispose not only the magnetic shield layer 85 but also the magnetic shield layer 81 described in the first embodiment. In this case, the leak of the magnetic flux as a cause of the propagation loss of the magnetic flux can be more certainly suppressed.

Third Embodiment

Figure 25:
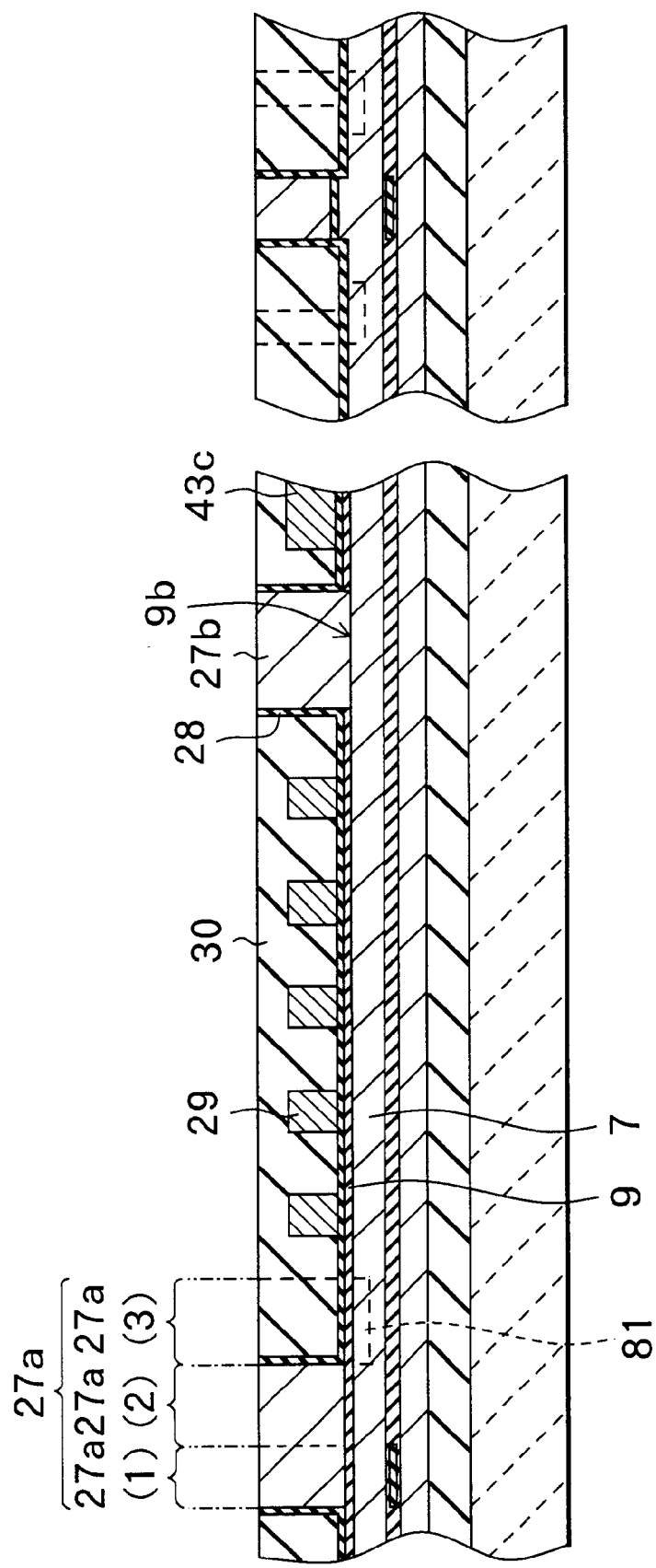
FIGS. 25A and 25B are cross sections for explaining a process in a method of manufacturing a thin film magnetic head according to the third embodiment of the invention.
Figure 26:
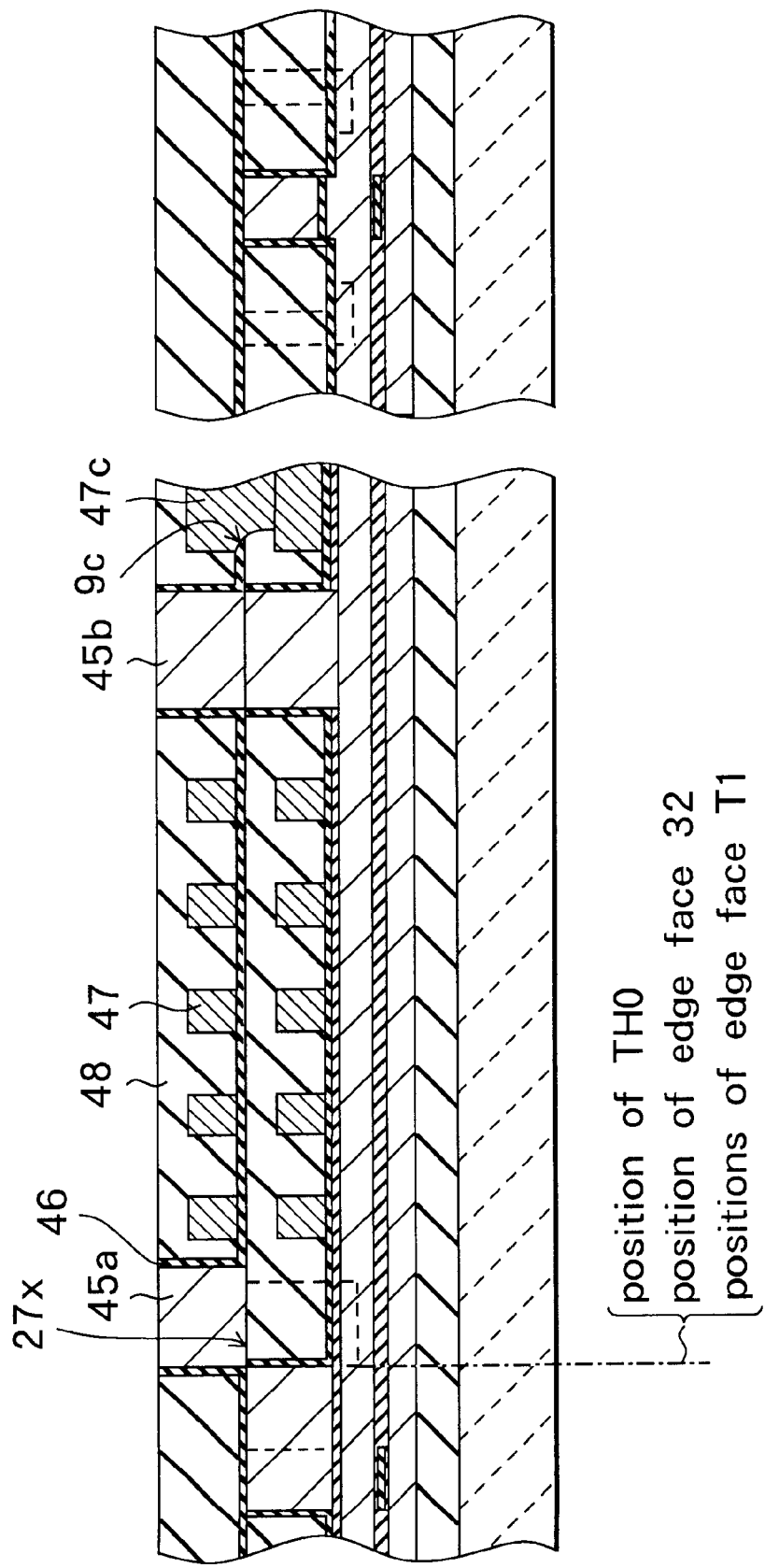
FIGS. 26A and 26B are cross sections for explaining a process subsequent to FIGS. 25A and 25B, respectively.
Figure 27:
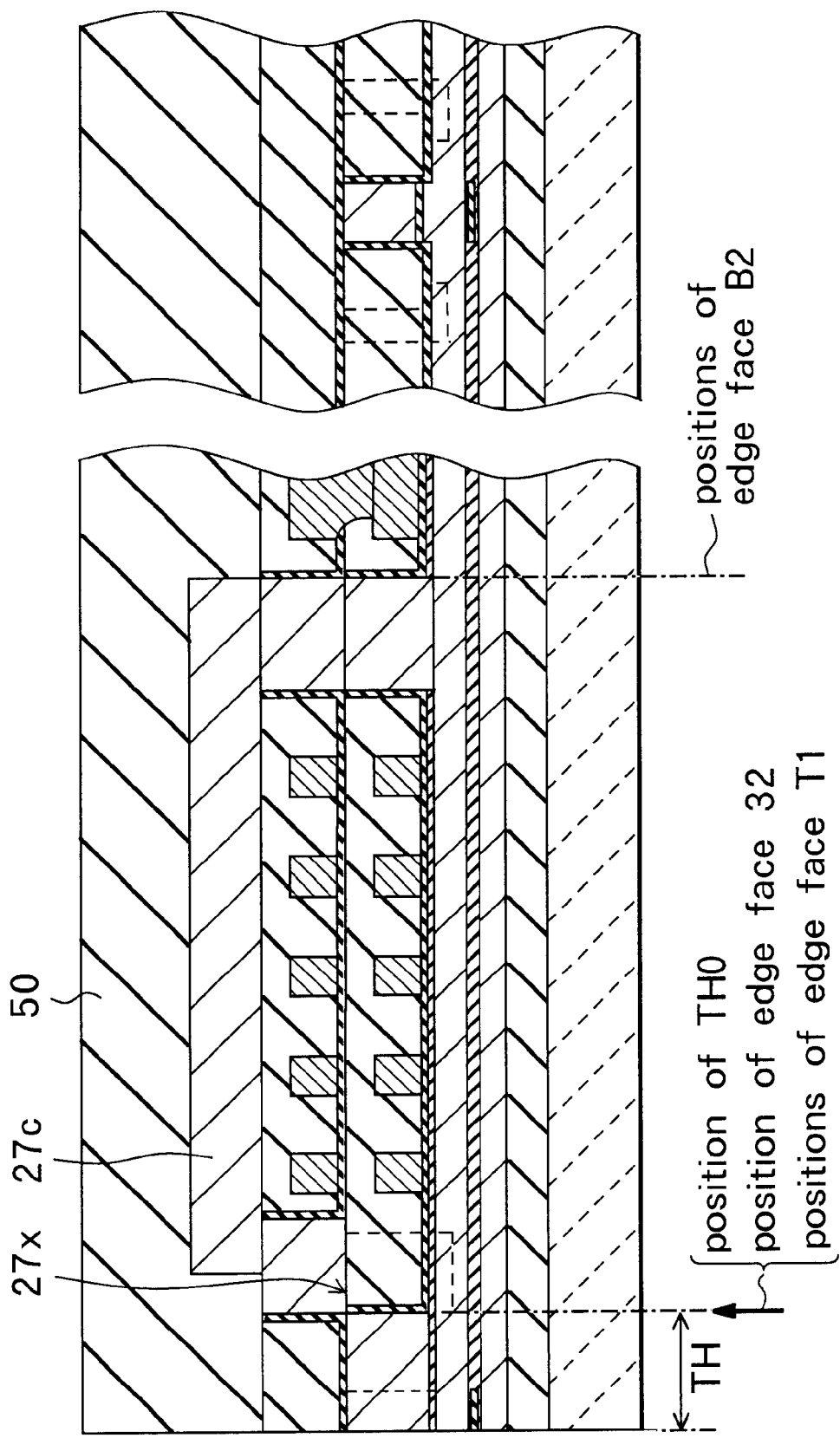
FIGS. 27A and 27B are cross sections for explaining a process subsequent to FIGS. 26A and 26B, respectively.

Referring to FIGS. 25A and 25B to FIGS. 27A and 27B, a method of manufacturing a composite thin film magnetic head as a method of manufacturing a thin film magnetic head according to the third embodiment of the invention will be described. Since a thin film magnetic head according to the embodiment will be embodied by the method of manufacturing the thin film magnetic head according to the embodiment, it will be also described hereinbelow. FIGS. 25A and 25B to FIGS. 27A and 27B show processes of manufacturing a thin film magnetic head according to the embodiment. FIGS. 25A, 26A and 27A are cross sections each of which is perpendicular to the air bearing surface and FIGS. 25B, 26B and 27B are cross sections each of which is parallel to the air bearing surface of the pole part. In the drawings, the same components as those in each of the foregoing embodiments are designated by the same reference numerals.

In the method of manufacturing the thin film magnetic head according to the embodiment, since the processes until the formation of the insulating film 28 in FIGS. 25A and 25B are similar to those in FIGS. 3A and 3B in the first embodiment, the description is omitted here.

In the embodiment, as shown in FIGS. 25A and 25B, after forming the insulating film 28, the first thin film coil 29 for an inductive recording head is formed in thickness of, for example, 1.5 to 2.5 $\mu$m by electroplating or the like in a recessed region formed between the top pole tip 27a and the magnetic path forming pattern 27b. Simultaneously, in the region rearward of the magnetic path forming pattern 27b, a coil connection portion 43c is formed. The coil connection portion 43c is used to connect the first thin film coil 29 to a second thin film coil 47 which will be described hereinlater.

Then, after forming the insulating layer 30 having a thickness of 3.0 to 4.0 $\mu$m made of an insulating material such as alumina by sputtering on the whole surface, the surface is planarized by, for example, CMP to expose the surface of each of the top pole tip 27a and the magnetic path forming pattern 27b.

Figure 28:
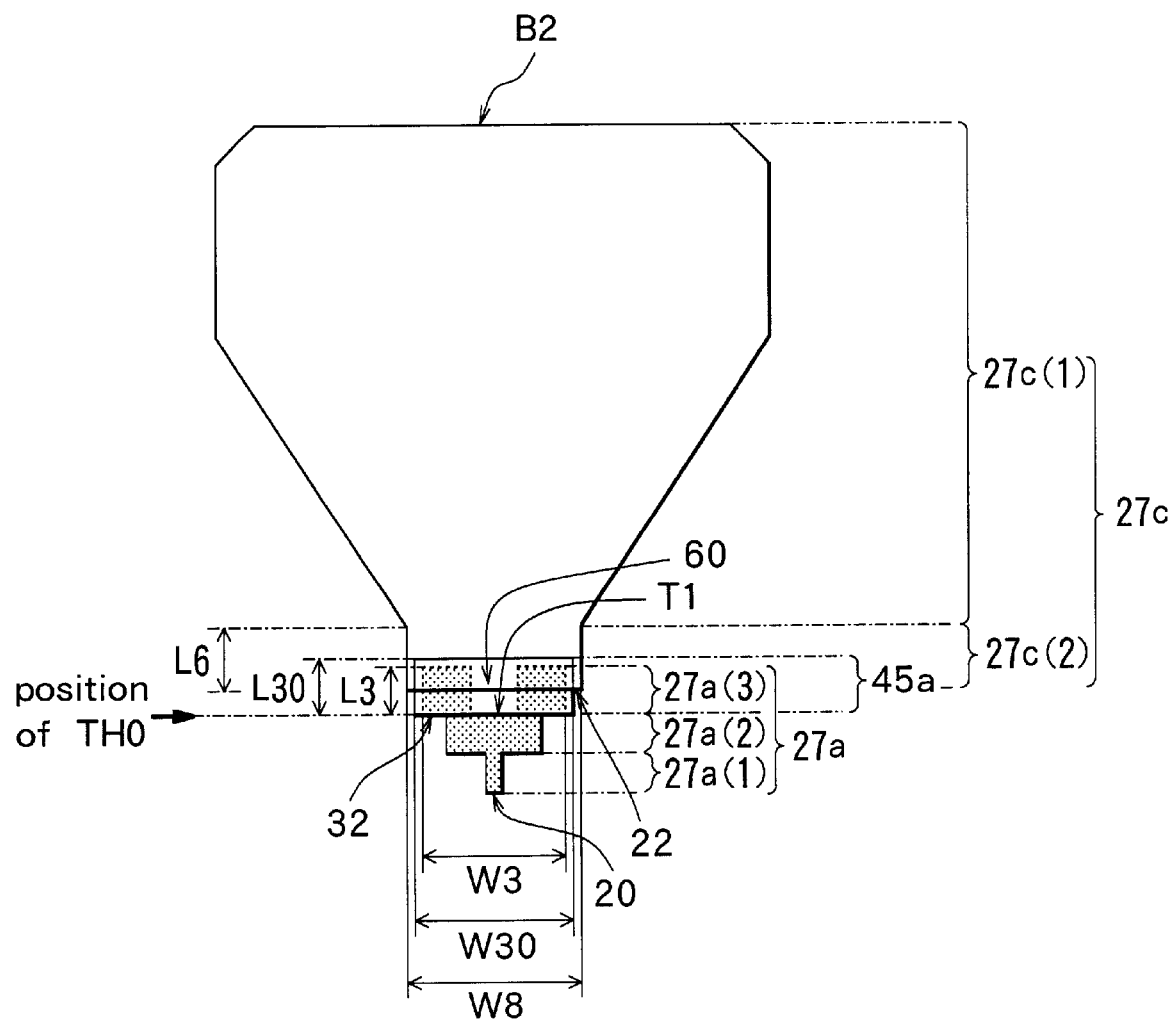
FIG. 28 is a plan view showing the structure of a top pole and a top pole tip of a thin film magnetic head according to the third embodiment of the invention.

As shown in FIG. 26A, on a flat surface in front of the insulating layer 30 in which the thin film coil 29 is buried, a top connection portion 45a for magnetically coupling to the connection portion 27a(3) in the top pole tip 27a is formed. At this time, the top connection portion 45a overlaps and is in contact with the connection portion 27a(3) in the top pole tip 27a and is formed so as to extend rearward longer than the connection portion 27a(3) in the top pole tip 27a. In the embodiment, the contact face of the top pole tip 27a and the top connection portion 45a corresponds to the magnetic coupling face 27x. The shape in plane of the top connection portion 45a is, for example, a rectangle as shown in FIG. 28 which will be described hereinlater. Further, in the top connection portion 45a, the position of the edge face 32 on the front side coincides with, for example, the position of the edge face T1 (that is, the TH0 position). In the case of forming the top connection portion 45a, simultaneously, a top connection portion 45b for magnetically coupling to the magnetic path forming pattern 27b and for finally connecting the top pole and the bottom pole is formed. At this time, the top connection portion 45b overlaps and is in contact with the magnetic path forming pattern 27b and is formed, for example, so as to coincide with the length of the magnetic path forming pattern 27b. The material and the manufacturing method of the top connection portions 45a and 45b are similar to, for example, those of the top pole tip 27a. The top connection portion 45a corresponds to an example of "third magnetic portion" in the invention.

Subsequently, an insulating film 46 made of alumina or the like is formed on the whole surface in thickness of about 0.3 to 0.6 $\mu$m by, for example, sputtering or CVD. The insulating films 46 and 30 on the coil connection portion 43c are patterned by photolithography to form an opening 9c which reaches the coil connection portion 43c. On the insulating film 46 in the recess formed in the region between the top connection portions 45a and 45b, the second thin film coil 47 for an inductive recording head made of copper (Cu) or the like is formed in thickness of 1.5 to 2.5 $\mu$m by, for example, electroplating. Simultaneously, a coil connection portion 47c which is in contact with the coil connection portion 43c via the opening 9c is formed.

An insulating layer 48 made of alumina or the like is formed in thickness of about 3 to 4 $\mu$m on the whole surface by, for example, sputtering or CVD. The material of the insulating layer 48 and the insulating film 46 is not limited to alumina but other insulating materials such as silicon dioxide ($SiO_2$) and silicon nitride (SiN) can be also used.

Subsequently, the insulating layer 48 and the insulating film 46 are polished by, for example, CMP so that the surface of each of the top connection portions 45a and 45b is exposed, and the surfaces of the insulating layer 48, the insulating film 46 and the top connection portions 45a and 45b are planarized so as to be flush with each other.

As shown in FIGS. 27A and 27B, the top pole is selectively formed in thickness of about 3 to 4 μm by electroplating, sputtering or the like by using, for example, the same material as that of the top pole tip 27a. As the top pole, as shown in FIG. 28 which will be explained hereinlater, for example, the top pole 27c(FIG. 11) in each of the foregoing embodiments can be used. In this case, a part of the connection portion 27c(2) in the front side in the top pole 27c overlaps with the top connection portion 45a and, for example, the position of the edge face 22 on the front side (air bearing surface side) of the connection portion 27c(2) is deviated rearward (side opposite to the air bearing surface) of the position of the edge face T1 (that is, the TH0 position) and the position of the edge face 32 on the front side of the top connection portion 45a. A part of the yoke 27c(1) on the rear side of the top pole 27c overlaps with the top connection portion 45b and, for example, the position of the edge face B2 on the rear side of the yoke 27c(1) coincides with the position of the edge face on the rear side of the magnetic path forming pattern 27b and the top connection portion 45b. The top pole 27c is thereby magnetically coupled to the top connection portion 45a and the top pole tip 27a and is also magnetically coupled to the bottom pole 7 via the top connection portion 45b and the magnetic path forming pattern 27b.

Finally, an overcoat layer 50 having a thickness of about 30 μm made of alumina is formed by, for example, sputtering so as to cover the whole surface. After that, a slider is machined to thereby form the air bearing surface (ABS) of the recording head and the reproducing head. In such a manner, the thin film magnetic head is completed.

Figure 29:
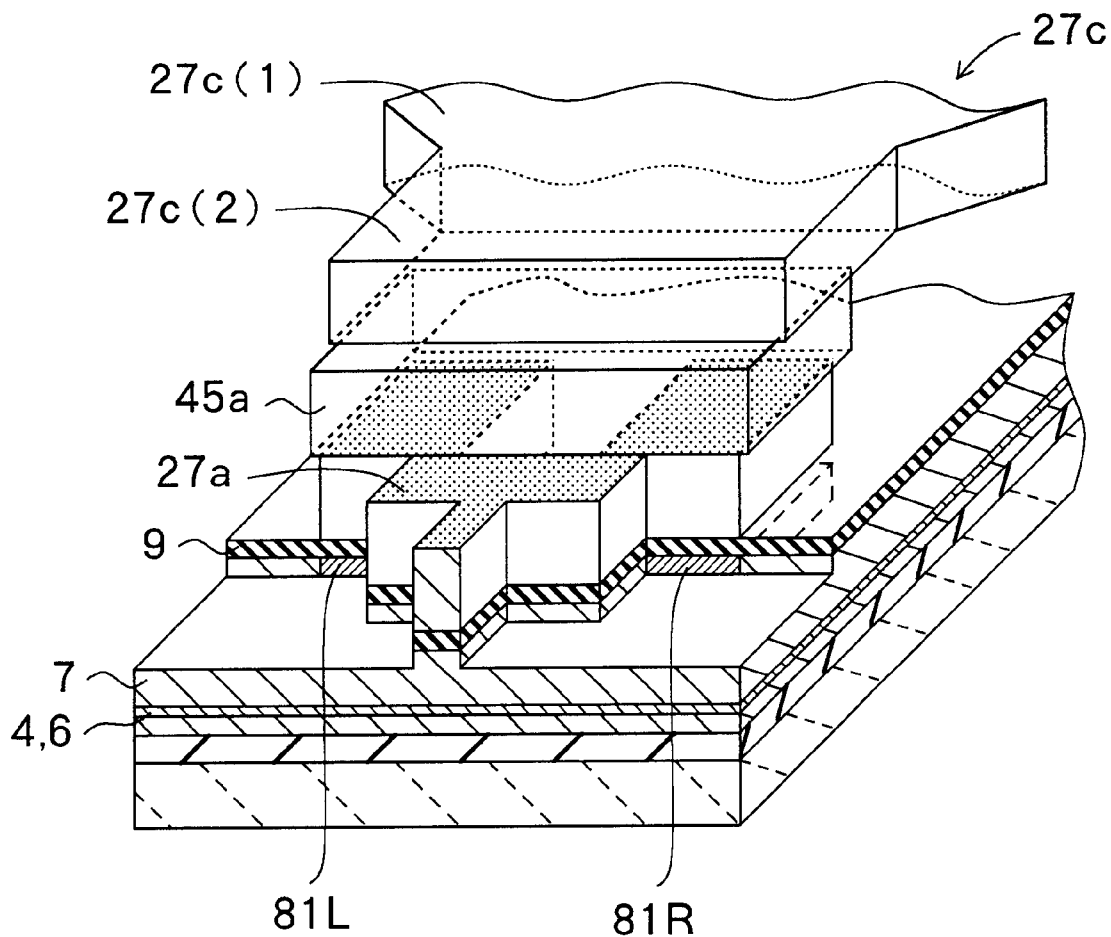
FIG. 29 is a perspective view showing a stereoscopic structure of the top pole and the top pole tip of the thin film magnetic head according to the third embodiment of the invention.
Figure 30:
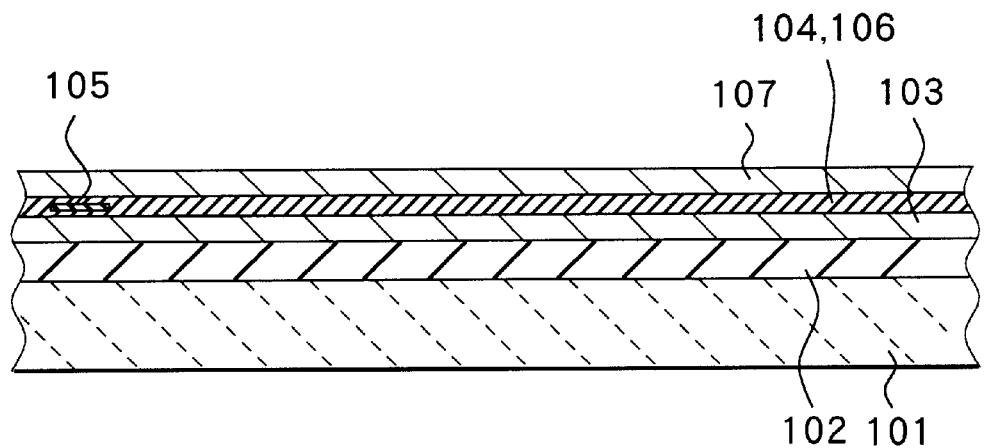
FIG. 30 is a cross section for explaining a process in a method of manufacturing a conventional thin film magnetic head.
Figure 31:
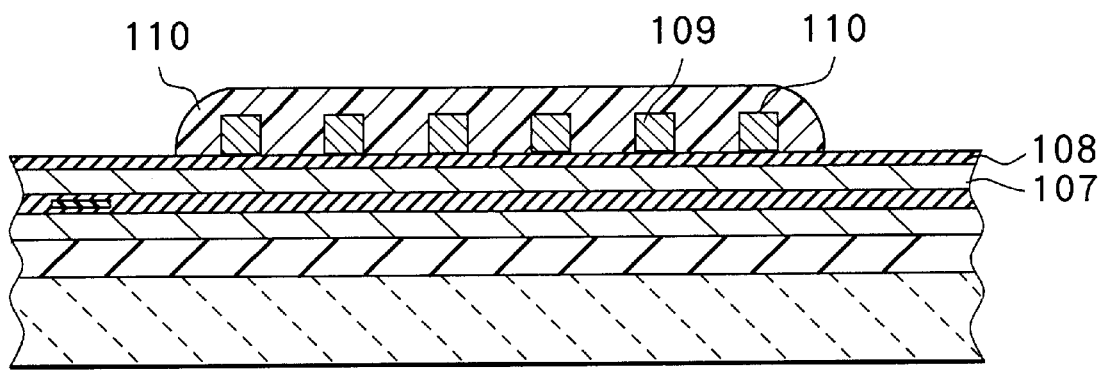
FIG. 31 is a cross section for explaining a process subsequent to FIG. 30.

FIG. 28 is a plan view of the top pole 27c, the top connection portion 45a and the top pole tip 27a of the thin film magnetic head manufactured by the manufacturing method according to the embodiment. FIG. 29 is a perspective view showing the stereoscopic structure of the element shown in the cross sections of FIGS. 27A and 27B. In FIGS. 28 and 29, the same components as those in the foregoing embodiments are designated by the same reference numerals and the description is properly omitted. In FIG. 29, the overcoat layer 50, the thin film coils 29 and 47, the insulating layer 30 and the like are omitted.

As shown in FIG. 28, for example, the top connection portion 45a has a rectangular shape in plane and has a width of W30 and a length of L30. As shown in FIGS. 27A and 27B and FIG. 29, the top connection portion 45a is disposed so that a part of its under face is positioned in contact with and overlaps with the connection portion 27a(3) in the top pole tip 27a and its top face is in contact with a part of the connection portion 27c(2) of the top pole 27c. Consequently, the magnetic flux generated by the thin film coils 29 and 47 propagates from the yoke 27c(1) having a large area in the top pole 27c to the top pole tip 27a via the connection portion 27c(2) (width W8 and length L6), the top connection portion 45a (width W30 and length L30) and further the connection portion 27a(3) (width W3 and length L3).

In the embodiment, as shown in FIG. 28, the width of each of the connection portion 27c(2) in the top pole 27c, the top connection portion 45a and the top pole tip 27a is set so as to satisfy the relation of W8>W30>W3 and the length is set so as to satisfy the relation of L6 >L30 >L3. The magnetic flux propagating from the top pole 27c to the top pole tip 27a via the portions is therefore converged step by step. The magnetic flux propagated to the connection portion 27a(3) in the top pole tip 27a is further converged in a process of propagation to the intermediate coupling portion 27a(2) and the front end portion 27a(1) of the top pole tip 27a.

Since the two thin film coils 27 and 49 are provided in the embodiment as described above, the absolute volume of the magnetic flux generated in the thin film coil portion can be increased. In this case as well, because of the existence of the magnetic shield layer 81, the leak of the magnetic flux in the overlap region corresponding to the magnetic coupling face 27x of the top pole tip 27a and the top connection portion 45a can be suppressed. A sufficient magnetic flux can be therefore supplied to the front end portion 27a(1) in the top pole tip 27a while avoiding the propagation loss of the magnetic flux.

In the embodiment, by forming the thin film coil in the two-layered structure, a space is created between the front end portion 27a(1) and the top pole 27c. In the embodiment, by using the space, the top connection portion 45a as a third magnetic portion is provided. Because of the existence of the top connection portion 45a, a magnetic volume is assured in the thickness direction in the region rearward of the front end portion 27a(1) in the top pole tip 27a. The magnetic volume serves as a space for storing a large amount of magnetic flux generated by the two thin film coils 27 and 49. Consequently, occurrence of magnetic saturation in the region rearward of the front end portion 27a(1) of the top pole tip 27a can be avoided and a sufficient volume of the magnetic flux is supplied to the front end portion 27a(1) of the top pole tip 27a. As a result, an excellent overwrite characteristic can be assured.

Since the top pole tip 27a, the top connection portion 45a and the top pole 27c can be formed on a flat portion in the embodiment, the photoresist pattern can be formed by photolithography with high precision, and the width of the front end portion 27a(1) of the top pole tip 27a can be narrowed with accuracy of 0.5 to 0.25 μm. The top connection portion 45a and the top pole 27c can be also formed on the flat portion which has been subjected to the CMP. Thus, high-precision patterning can be realized for a similar reason.

Actions, effects, modifications and the like of the construction other than the above of the thin film magnetic head in the embodiment are similar to those in the first embodiment.

The position of the edge face 32 on the front side of the top connection portion 45a in the embodiment does not always have to coincide with the position of the edge face T1. The position of the edge face 32 may be set so as to be deviated to the forward or rearward within the range of, for example, 0.5 to 1.0 μm by using the position of the edge face T1 as a reference. In this case as well, by forming the magnetic shield layer 81 in the overlap region corresponding to the magnetic coupling face 27x between the top pole tip 27a and the top connection portion 45a, a leak of the magnetic flux can be suppressed.

The position of the edge face 22 on the front side of the connection portion 27c(2) in the top pole 27c in the embodiment does not always have to be deviated rearward of the edge face T1 which determines the TH0 position. For example, the position of the edge face 22 may coincide with the position of the edge face T1 as shown in FIG. 11 in the first embodiment or may be deviated to the forward of the position of the edge face T1 as in FIG. 17. The length of a deviation between the position of the edge face 22 and the position of the edge face T1 when the position of the edge face 22 is deviated to the forward of the position of the edge face T1 is, preferably, set within the range from 0.5 to 1.0 $\mu$m by using the position of the edge face T1 as a reference.

In the embodiment, the magnetic shield layer 85 described in the second embodiment may be disposed in place of the magnetic shield layer 81 and, further, both the magnetic shield layers 81 and 85 may be disposed. Also in those cases, a leak of the magnetic flux as a cause of the propagation loss of the magnetic flux can be suppressed.

Although the invention has been described above by some embodiments, the invention is not limited to the embodiments but can be variously modified. In the embodiments, for example, the case of using the top pole tip 27a and the top pole 27c each having the shape in plane as shown in FIG. 11 has been described. The invention is not limited to the case. For example, the shape of each of the portions constructing the top pole tip 27a and the top pole 27c may be variously modified. In this case, the shape in plane of the magnetic coupling face changes according to the shape of the top pole tip. It is therefore preferable to similarly change the shape in plane of the magnetic shield layer so as to correspond to that of the magnetic coupling face. The top connection portion 45a in the third embodiment is similar to the above.

Although the method of manufacturing a composite thin film magnetic head has been described in the foregoing embodiments and their modifications, the invention can be also applied to a thin film magnetic head dedicated to recording having an inductive magnetic transducer for writing and a thin film magnetic head having an inductive magnetic transducer for recording and reproducing. The invention can be also applied to a thin film magnetic head in which the stacking order of an element for writing and an element for reading is reversed.

As described above, according to the thin film magnetic head of the invention or the method of manufacturing the thin film magnetic head of the invention, one of the two magnetic layers includes: the first magnetic portion which extends so as to be apart from the recording-medium-facing surface; and the second magnetic portion which partially overlaps with the first magnetic portion and is magnetically coupled to the first magnetic portion in the overlap region where the first and second magnetic portions overlap with each other, and in the overlap region where the first and second magnetic portions overlap with each other, the magnetic shield layer for suppressing propagation of a magnetic flux between the first magnetic portion and the other magnetic layer in the region is formed so as to be adjacent to the gap layer. Consequently, the magnetic flux entered the overlap region can be prevented from passing the gap layer. As a result, the sufficient magnetic flux generated by the thin film coil can be made to propagate from the second magnetic portion to the first magnetic portion without a loss.

According to the thin film magnetic head of one aspect of the invention or the method of manufacturing the thin film magnetic head of one aspect of the invention, the second magnetic portion comprises: the track width defining portion which extends with constant width so as to be apart from the recording-medium-facing surface which faces the recording medium and defines a recording track width of the recording medium; the two or more connection portions which are magnetically coupled to the first magnetic portion and are disposed so as to be apart from each other in the track width direction; and the intermediate coupling portion which has an edge portion for defining an edge on the recording-medium-facing surface side of the insulating layer and magnetically couples the track width defining portion and the two or more connection portions. Consequently, at the time the intermediate coupling portion is formed, the position as a reference of a distance from the edge on the recording-medium-facing surface side of the insulating layer to the recording-medium-facing surface, which exerts an influence on a recording characteristic is determined. As a result, it is easy to accurately control the distance, that is, the throat height TH, so that variations in the recording characteristic can be more suppressed. The magnetic flux which is generated by the thin film coil and propagates from the first magnetic portion to the second magnetic portion passes through the two or more connection portions which are disposed apart from each other in the width direction. Consequently, a magnetic flux saturation due to local concentration of the magnetic flux is avoided and the magnetic flux smoothly propagates. Since the two characteristics of the accurate control characteristic of the throat height TH and the smooth propagating characteristic of the magnetic flux act synergistically, even when the width of the track width defining portion is reduced to, for example, the order of submicrons, the sufficient overwrite characteristic can be assured.

According to the thin film magnetic head of another aspect of the invention, the step face of the intermediate coupling portion in the step provided in the position where the track width defining portion and the intermediate coupling portion are coupled to each other is substantially perpendicular to the extending direction of the track width defining portion. Consequently, the action of suppressing the influence of unnecessary reflection light from the underlayer in the photolithography process for forming the track width defining portion can be expected. Thus, the track width defining portion with the higher-precision width can be formed. Also in the case of further narrowing the width of the track width defining portion, therefore, the width can be controlled to be constant and the magnetic flux converged at the tip of the track width defining portion can be supplied, so that the excellent overwrite characteristic can be assured.

According to the thin film magnetic head of still another aspect of the invention or the method of manufacturing the thin film magnetic head of still another aspect of the invention, the one of the magnetic layers further includes a third magnetic portion which is provided between the first and second magnetic portions and magnetically couples the first and second magnetic portions. Consequently, the magnetic volume can be assured between the first and second magnetic portions upon propagation of the magnetic flux from the first magnetic portion to the second magnetic portion. Therefore, the magnetic flux propagates from the first magnetic portion to the second magnetic portion more smoothly.

Obviously many modifications and variations of the present invention are possible in the light of the above teachings. It is therefore to be understood that within the scope of the appended claims the invention may be practiced otherwise than as specifically described.

What is claimed is:

1. A thin film magnetic head including:
    two magnetic layers magnetically coupled to each other and having respectively two magnetic poles which face each other with a gap layer in between in part close to a recording-medium-facing surface facing a recording medium, a thin film coil provided between the two magnetic layers, and an insulating layer for insulating the thin film coil from the two magnetic layers, wherein one of the two magnetic layers includes:
a first magnetic portion which extends so as to be apart from the recording-medium-facing surface; and
a second magnetic portion which partially overlaps with the first magnetic portion and is magnetically coupled to the first magnetic portion in an overlap region where the first and second magnetic portions overlap with each other,
the other magnetic layer in the two magnetic layers extends so as to be apart from the recording-medium-facing surface, and
a magnetic shield layer for suppressing propagation of a magnetic flux between the first magnetic portion and the other magnetic layer is formed in at least the overlap region so as to be adjacent to the gap layer.

2. A thin film magnetic head according to claim 1, wherein the magnetic shield layer has a plan shape corresponding to a plan shape of the overlap region.

3. A thin film magnetic head according to claim 1, wherein the magnetic shield layer is formed so as to occupy a part of the other magnetic layer.

4. A thin film magnetic head according to claim 1, wherein the magnetic shield layer is formed so as to occupy a part of the first magnetic portion.

5. A thin film magnetic head according to claim 1, wherein the first magnetic portion comprises:
a track width defining portion which extends with constant width so as to be apart from the recording-medium-facing surface and defines a recording track width of the recording medium;
two or more connection portions which are magnetically coupled to a part of the second magnetic portion and are disposed so as to be apart from each other in the track width direction; and
an intermediate coupling portion which has an edge for defining an edge on the recording-medium-facing surface of the insulating layer and magnetically couples the track width defining portion and the two or more connection portions, and
the two or more connection portions and the second magnetic portion overlap with each other in the overlap region.

6. A thin film magnetic head according to claim 5, wherein the magnetic shield layer is formed so that the position of its edge on the recording-medium-facing surface side either coincides with the position of the edge on the recording-medium-facing surface side in the intermediate coupling portion of the first magnetic portion or is deviated from the position so as to be apart from the recording-medium-facing surface.

7. A thin film magnetic head according to claim 5, wherein a step in the width direction is formed in a position where the track width defining portion and the intermediate coupling portion in the first magnetic portion are coupled to each other, in such a manner that the width of the track width defining portion is narrower than the width of the intermediate coupling portion at the coupling position.

8. A thin film magnetic head according to claim 7, wherein a step face of the intermediate coupling portion in the step is substantially perpendicular to the extending direction of the track width defining portion.

9. A thin film magnetic head according to claim 5, wherein the first magnetic portion is formed so that the width of the intermediate coupling portion is narrower than the width of a connection region defined by the two or more connection portions, at the position where the intermediate coupling portion and the two or more connection portions are coupled to each other.

10. A thin film magnetic head according to claim 1, wherein the one of the magnetic layers further includes a third magnetic portion which is provided between the first and second magnetic portions and magnetically couples the first and second magnetic portions together.

11. A thin film magnetic head according to claim 10, wherein the third magnetic portion is disposed so as to overlap with both a part of the first magnetic portion and a part of the second magnetic portion.

12. A method of manufacturing a thin film magnetic head including: two magnetic layers magnetically coupled to each other and having respectively two magnetic poles which face each other with a gap layer in between in part close to a recording-medium-facing surface facing a recording medium, a thin film coil provided between the two magnetic layers, and an insulating layer for insulating the thin film coil from the two magnetic layers, the method comprising the steps of:
forming one of the two magnetic layers so as to include:
a first magnetic portion which extends so as to be apart from the recording-medium-facing surface; and a second magnetic portion which partially overlaps with the first magnetic portion and is magnetically coupled to the first magnetic portion in an overlap region where the first and secondd magnetic portions overlap with each other;
forming the other of the two magnetic layers which extends so as to be apart from the recording-medium-facing surface; and
forming a magnetic shield layer for suppressing propagation of a magnetic flux between the first magnetic portion and the other magnetic layer is formed in at least an overlap region so as to be adjacent to the gap layer.

13. A method of manufacturing a thin film magnetic head according to claim 12, wherein the other magnetic layer is formed as a single layer,
a recess is selectively formed in a part of the other magnetic layer formed, and the recess is filled with the magnetic shield layer is.

14. A method of manufacturing a thin film magnetic head according to claim 12, wherein the other magnetic layer is formed so as to have a layered structure consist of a plurality of layers,
at least an opening is selectively formed in a layer adjacent to the gap layer upon formation of the layered structure, and the opening is filled with magnetic shield layer.

15. A method of manufacturing a thin film magnetic head according to claim 12, wherein the magnetic shield layer is formed so as to have the plan shape corresponding to that of the overlap region.

16. A method of manufacturing a thin film magnetic head according to claim 12, wherein the magnetic shield layer is formed so as to occupy a part of the other magnetic layer.

17. A method of manufacturing a thin film magnetic head according to claim 12, wherein the magnetic shield layer is formed so as to occupy a part of the first magnetic portion.

18. A method of manufacturing a thin film magnetic head according to claim 12, wherein the first magnetic portion comprises:

a track width defining portion which extends with constant width so as to be apart from the recording-medium-facing surface and defines a recording track width of the recording medium;

two or more connection portions which are magnetically coupled to a part of the second magnetic portion and are disposed so as to be apart from each other in the track width direction; and an intermediate coupling portion which has an edge for defining an edge on the recording-medium-facing surface side of the insulating layer and magnetically couples the track width defining portion and the two or more connection portions, and the first magnetic portion is formed so that the two or more connection portions and the second magnetic portion overlap with each other in the overlap region.

19. A method of manufacturing a thin film magnetic head according to claim 18, wherein the magnetic shield layer is formed so that the position of its edge on the recording-medium-facing surface side either coincides with the position of the edge on the recording-medium-facing surface side in the intermediate coupling portion of the first magnetic portion or is deviated from the position so as to be apart from the recording-medium-facing surface.

20. A method of manufacturing a thin film magnetic head according to claim 12, further comprising a step of forming a third magnetic portion for magnetically coupling the first and second magnetic portions between the first and second magnetic portions together.

21. A method of manufacturing a thin film magnetic head according to claim 20, wherein the first, second, and third magnetic portions are formed so that the third magnetic portion overlaps with both a part of the first magnetic portion and a part of the second magnetic portion.

22. A method of manufacturing a thin film magnetic head including: first and second magnetic layers magnetically coupled to each other and having respectively two magnetic poles which face each other via a gap layer in between in part close to a recording-medium-facing surface facing a recording medium, a thin film coil provided between the two magnetic layers, and an insulating layer for insulating the thin film coil from the two magnetic layers, the method comprising the steps of:

forming the first magnetic layer as a single layer;

forming a recess in the thickness direction in a part of the first magnetic layer;

forming a magnetic shield layer by filling the recess of the first magnetic layer with a non-magnetic material;

forming the gap layer so as to cover at least the surfaces of the first magnetic layer and the magnetic shield layer;

selectively forming the first magnetic portion serving as a part of the second magnetic layer in a predetermined region on the gap layer;

forming the thin film coil in a region where the first magnetic portion is not formed in an upper region of the gap layer;

forming the insulating layer so as to cover the thin film coil; and selectively forming a second magnetic portion as another part of the second magnetic layer on the insulating layer and the first magnetic portion so as to partially overlap with and so as to be magnetically coupled with the first magnetic portion in a region corresponding to the region in which the magnetic shield layer is formed.

23. A method of manufacturing a thin film magnetic head including: first and second magnetic layers magnetically coupled to each other and having respectively two magnetic poles which face each other via a gap layer in between in part close to a recording-medium-facing surface facing a recording medium, a thin film coil provided between the two magnetic layers, and an insulating layer for insulating the thin film coil from the two magnetic layers, the method comprising the steps of:

forming the first magnetic layer as a layered structure having an opening in a predetermined region in at least the uppermost layer;

forming a magnetic shield layer by filling the opening in the uppermost layer of the first magnetic layer with a non-magnetic material;

forming the gap layer so as to cover at least the surface of each of the first magnetic layer and the magnetic shield layer;

selectively forming the first magnetic portion serving as a part of the second magnetic layer in a predetermined region on the gap layer;

forming the thin film coil in a region where the first magnetic portion is not formed;

forming the insulating layer so as to cover the thin film coil; and selectively forming a second magnetic portion as another part of the second magnetic layer on the insulating layer and the first magnetic portion so as to partially overlap with and so as to be magnetically coupled with the first magnetic portion in a region corresponding to the region in which the magnetic shield layer is formed.

24. A method of manufacturing a thin film magnetic head including: first and second magnetic layers magnetically coupled to each other and having respectively two magnetic poles which face each other via a gap layer in between in part close to a recording-medium-facing surface facing a recording medium, a thin film coil provided between the two magnetic layers, and an insulating layer for insulating the thin film coil from the two magnetic layers, the method comprising the steps of:

forming the first magnetic layer;

forming the gap layer so as to cover the surface of the first magnetic layer;

selectively forming a magnetic shield layer made of a non-magnetic material on the gap layer;

selectively forming a first magnetic portion serving as a part of the second magnetic layer on the gap layer so that its part covers the magnetic shield layer;

forming the thin film coil in a region where the first magnetic portion is not formed;

forming the insulating layer so as to cover the thin film coil; and selectively forming a second magnetic portion as another part of the second magnetic layer on the insulating layer and the first magnetic portion so as to partially overlap with and so as to be magnetically coupled with the first magnetic portion in a region corresponding to the region in which the magnetic shield layer is formed.

* * * * *